(12) United States Patent
Guo et al.

(10) Patent No.: US 11,287,969 B2
(45) Date of Patent: Mar. 29, 2022

(54) OBJECT PROCESSING METHOD AND APPARATUS, STORAGE MEDIUM, AND ELECTRONIC APPARATUS

(71) Applicant: TENCENT TECHNOLOGY (SHENZHEN) COMPANY LIMITED, Shenzhen (CN)

(72) Inventors: Zhaoxing Guo, Shenzhen (CN); Zhitang Lu, Shenzhen (CN); Xuyang Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/897,254

(22) Filed: Jun. 9, 2020

(65) Prior Publication Data

US 2020/0301578 A1 Sep. 24, 2020

Related U.S. Application Data

(63) Continuation of application No. PCT/CN2019/071762, filed on Jan. 15, 2019.

(30) Foreign Application Priority Data

Mar. 27, 2018 (CN) .................. 201810267638.X

(51) Int. Cl.
*G06F 3/0488* (2013.01)
*G06F 3/0482* (2013.01)
(Continued)

(52) U.S. Cl.
CPC ........ *G06F 3/04883* (2013.01); *G06F 3/0482* (2013.01); *G06F 3/04845* (2013.01); *G06F 7/24* (2013.01); *G06F 17/18* (2013.01)

(58) Field of Classification Search
CPC .............. G06F 3/04883; G06F 3/0482; G06F 3/04845; G06F 7/24; G06F 17/18;
(Continued)

(56) References Cited

U.S. PATENT DOCUMENTS

2015/0375103 A1* 12/2015 George .................. A63F 13/86
463/24
2016/0121205 A1* 5/2016 Sirois .................... A63F 9/0612
463/9

(Continued)

FOREIGN PATENT DOCUMENTS

CN 105260100 A 1/2016
CN 108579086 A 9/2018

OTHER PUBLICATIONS

The World Intellectual Property Organization (WIPO) International Search Report for PCT/CN2019/071762 dated Apr. 17, 2019 6 Pages (including translation).
(Continued)

*Primary Examiner* — Angie Badawi
(74) *Attorney, Agent, or Firm* — Anova Law Group, PLLC

(57) ABSTRACT

An object processing method includes: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and using the first target object in the virtual scene, displaying the first target object in a third target area in the virtual scene, and hiding
(Continued)

the second target area in the virtual scene in response to the second target gesture. The third target area is a shortcut display area of the client.

20 Claims, 8 Drawing Sheets

(51) Int. Cl.
   *G06F 3/0484* (2013.01)
   *G06F 7/24* (2006.01)
   *G06F 17/18* (2006.01)
   *G06F 3/04883* (2022.01)
   *G06F 3/04845* (2022.01)

(58) Field of Classification Search
   CPC .... G06F 3/0484; A63F 13/533; A63F 13/537; A63F 13/55; A63F 13/822; A63F 13/837; A63F 13/2145; A63F 13/52; A63F 2300/807; A63F 2300/8076
   See application file for complete search history.

(56) References Cited

U.S. PATENT DOCUMENTS

| | | | |
|---|---|---|---|
| 2017/0151503 A1 | 6/2017 | Kumagai et al. | |
| 2018/0028906 A1* | 2/2018 | Tang | A63F 13/533 |
| 2018/0207522 A1* | 7/2018 | Roman | A63F 13/2145 |
| 2018/0247455 A1* | 8/2018 | Ullom | G06T 7/66 |
| 2020/0306638 A1* | 10/2020 | Fear | A63F 13/67 |

OTHER PUBLICATIONS

The State Intellectual Property Office of the People's Republic of China (SIPO) Office Action 1 for 201810267638.X dated Mar. 19, 2019 21 Pages (including translation).

Zhangfanggongzi, "(Non-official translation) How to Quickly Heal Life in Player Unknown's Battlegrounds", Baidu Jingyan, Game/Digital, Game, Video Game/Mobile Game, Mar. 25, 2018 (Mar. 25, 2018), Retrieved from Baidu using the Internet <URL: https://jingyan.baidu.com/article/925f8cb8ac4ce0c0dde056e4.html>, [retrieved on Jun. 8, 2020], main body, p. 2 8 pages (including translation).

Chimeiwangliangzhizhu11, "(Non-official translation) How to Quickly Take a Medicine in PlayerUnknown's Battlegrounds", Baidu jingyan, Game/Digital, Game, Network Game, Feb. 28, 2018 (Feb. 28, 2018), Retrieved from Baidu using the Internet <URL: https://jingyan.baidu.com/article/03b2f78c20c0f95ea337ae7d.html>, [retrieved on Jun. 8, 2020], main body, p. 2 8 pages (including translation).

Rufengsangongzi "How does the wilderness operation return blood," Baidu jingyan, Dec. 5, 2017 (Dec. 5, 2017), Retrieved from Baidu using the Internet <URL: https://jingyan.baidu.com/article/c1a3101e69de6cde656debd9.html>, [retrieved on Jun. 8, 2020], the entire document. 8 pages (including translation).

Rufengsangongzi, "PUBG: How to stimulation the battlefield to return blood," Baidu jingyan, Jun. 7, 2018 (Jun. 7, 2018), Retrieved from Baidu using the Internet <URL: https://jingyan.baidu.com/article/20095761e8fb6dcb0721b403.html>, [retrieved on Jun. 8, 2020], the entire document. 9 pages (including translation).

* cited by examiner

OBJECT PROCESSING METHOD AND APPARATUS, STORAGE MEDIUM, AND ELECTRONIC APPARATUS

RELATED APPLICATIONS

This application is a continuation application of PCT Patent Application No. PCT/CN2019/071762, filed on Jan. 15, 2019, which claims the priority to Chinese Patent Application No. 201810267638.X, entitled "OBJECT PROCESSING METHOD AND APPARATUS, STORAGE MEDIUM, AND ELECTRONIC APPARATUS" filed in State Intellectual Property Office of the People's Republic of China on Mar. 27, 2017, which is incorporated by reference in its entirety.

FIELD OF THE TECHNOLOGY

This application relates to the field of computers and, in particular, to an object processing method and apparatus, a storage medium, and an electronic apparatus.

BACKGROUND

Currently, a shortcut bar is usually used for selecting an object, which is merely for quickly using a single object. When there are a plurality of objects on a panel, the following four steps are required: panel unfolding, object selection, panel folding, and use of the selected object. Otherwise, the panel keeps unfolded, blocking a player's view.

During selection of an object, many steps need to be performed, and after the object is used up, a subsequent supplementary object usually needs to be manually adjusted by a player, failing to quickly select and use the object. In addition, processing of a target object is complex.

The disclosed methods and systems are directed to solve one or more problems set forth above and other problems.

SUMMARY

Embodiments of the present disclosure provide an object processing method and apparatus, a storage medium, and an electronic apparatus, to resolve at least a technical problem that processing of a target object is complex in the related art.

According to an aspect of the embodiments of the present disclosure, an object processing method is provided for a terminal. The method includes: detecting, on a client, a first target gesture performed on a first target area in a virtual scene displayed on the client; to displaying a second target area on the client in response to the first target gesture, the second target area including a plurality of to-be-processed objects in the virtual scene; detecting, on the client, a second target gesture performed on a first target object in the plurality of to-be-processed objects; and using the first target object in the virtual scene, displaying the first target object in a third target area in the virtual scene, and hiding the second target area in the virtual scene in response to the second target gesture. The third target area is a shortcut display area of the client, and the first target gesture simultaneously triggers the using the first target object in the virtual scene, displaying the first target object in a third target area in the virtual scene, and hiding the second target area in the virtual scene in response to the second target gesture to simplify object processing.

According to an aspect of the embodiments of the present disclosure, an object processing method is provided for a terminal. The method includes: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and displaying the first target object in a third target area in the virtual scene and hiding the second target area in the virtual scene in response to the second target gesture. The first target object is not used in the virtual scene. The third target area is a shortcut display area of the client, and the first target gesture simultaneously triggers the displaying the first target object in a third target area in the virtual scene, and hiding the second target area in the virtual scene in response to the second target gesture to simplify object processing.

According to another aspect of the embodiments of the present disclosure, an object processing apparatus is further provided. The apparatus includes at least one memory storing computer program instructions; and one or more processor coupled to the memory. When executing the computer program instructions, the processors are configured to perform: detecting, on a client, a first target gesture performed on a first target area in a virtual scene displayed on the client; displaying a second target area on the client in response to the first target gesture, wherein the second target area comprises a plurality of to-be-processed objects in the virtual scene; detecting, on the client, a second target gesture performed on a first target object in the plurality of to-be-processed objects; and using the first target object in the virtual scene, displaying the first target object in a third target area in the virtual scene, and hiding the second target area in the virtual scene in response to the second target gesture. The third target area is a shortcut display area of the client, and the first target gesture simultaneously triggers the using the first target object in the virtual scene, displaying the first target object in a third target area in the virtual scene, and hiding the second target area in the virtual scene in response to the second target gesture to simplify object processing.

Other aspects of the present disclosure can be understood by those skilled in the art in light of the description, the claims, and the drawings of the present disclosure.

BRIEF DESCRIPTION OF THE DRAWINGS

The accompanying drawings described herein are used for providing a further understanding of the present disclosure, and constitute a part of the present disclosure, but do not constitute any improper limitation to the present disclosure. Among the accompanying drawings.

DETAILED DESCRIPTION

To make a person skilled in the art better understand solutions of the present disclosure, the following describes the technical solutions in the embodiments of the present disclosure with reference to the accompanying drawings. Apparently, the described embodiments are merely some rather than all of the embodiments of the present disclosure. Other embodiments obtained by a person of ordinary skill in the art based on the embodiments of the present disclosure without creative efforts shall fall within the protection scope of the present disclosure.

The terms such as "first" and "second" in the specification, claims, and the foregoing accompanying drawings of the present disclosure are intended to distinguish between similar objects, but are not necessarily used for describing a specific sequence or a chronological order. It is to be understood that the data termed in such a way are interchangeable in proper circumstances, so that the embodiments of the present disclosure described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

According to an aspect of the embodiments of the present disclosure, an object processing method is provided.

Figure 1:
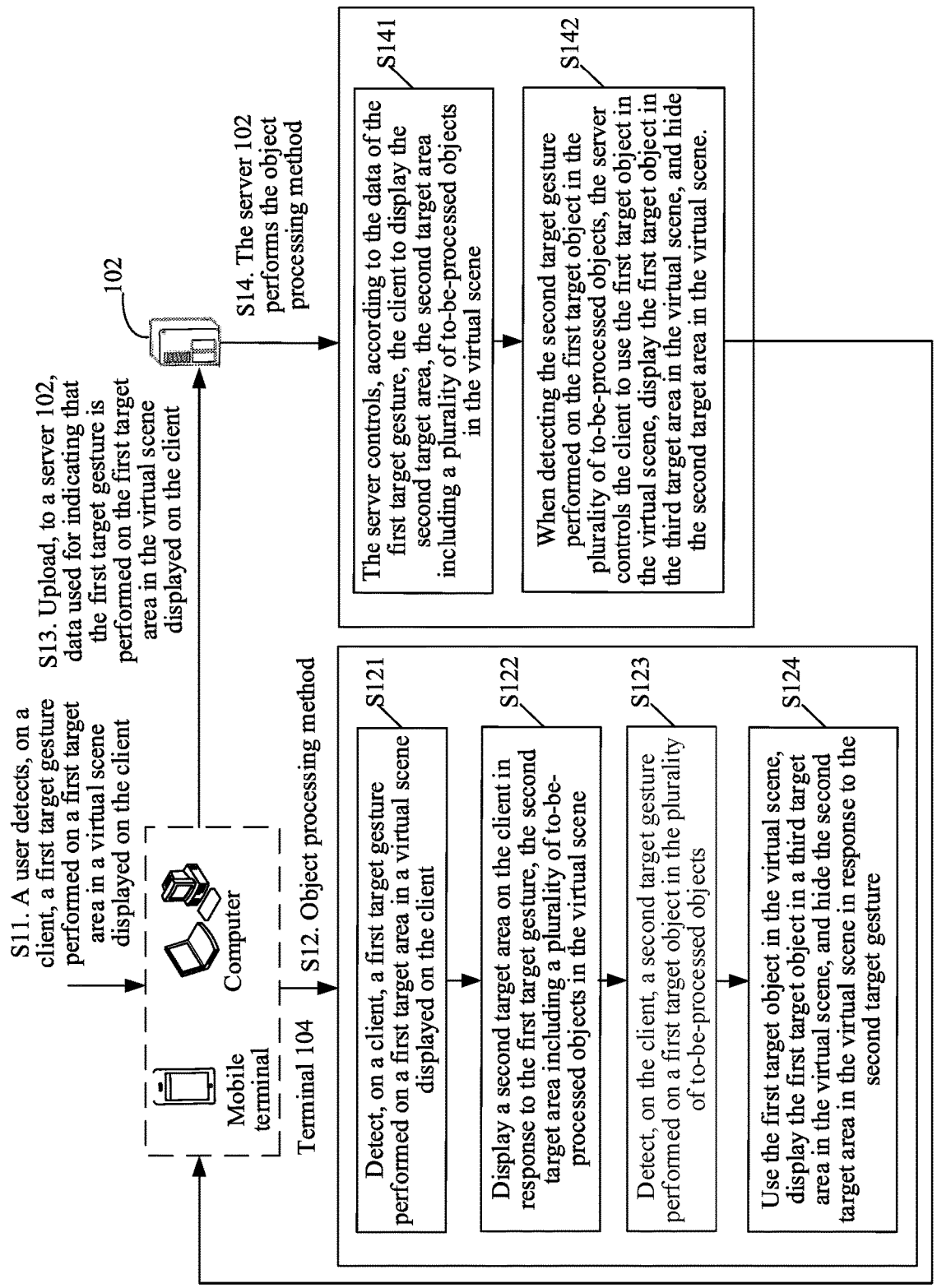
FIG. 1 is a schematic diagram of a hardware environment of an object processing method according to an embodiment of the present disclosure.

In one embodiment, the object processing method may be applied to a hardware environment shown in FIG. 1. FIG. 1 is a schematic diagram of a hardware environment of an object processing method according to an embodiment of the present disclosure. As shown in FIG. 1, the hardware environment may include a server 102 and a terminal 104. The server 102 is connected to the terminal 104 through a network. The network includes but is not limited to: a wide area network, a metropolitan area network, or a local area network. The terminal 104 is not limited to a PC, a mobile phone, or a tablet computer. The object processing method in one embodiment of the present disclosure may be performed by the server 102, or may be performed by the terminal 104, or may be performed jointly by the server 102 and the terminal 104. The object processing method to be performed by the terminal 104 in one embodiment of the present disclosure may also be performed by a client installed on the terminal.

The object processing method in one embodiment may be applied to a first-person shooting game (FPS for short). The method may include the followings.

S11: A user detects, on a client, a first target gesture performed on a first target area in a virtual scene displayed on the client.

S12: The terminal 104 performs the object processing method, e.g., S121 to S124.

S121: Detect, on a client, a first target gesture performed on a first target area in a virtual scene displayed on the client.

S122: Display a second target area on the client in response to the first target gesture, the second target area including a plurality of to-be-processed objects in the virtual scene.

S123: Detect, on the client, a second target gesture performed on a first target object in the plurality of to-be-processed objects.

S124: Use the first target object in the virtual scene (optionally, the first target object may not be used in the virtual scene as required, that is, in S124, the first target object is not used in the virtual scene), display the first target object in a third target area in the virtual scene, and hide the second target area in the virtual scene in response to the second target gesture.

S13: Upload, to the server 102, data used for indicating that the first target gesture is performed on the first target area in the virtual scene displayed on the client.

S14: The server 102 performs the object processing method, e.g., S141 to S142.

S141: The server controls, according to the data of the first target gesture, the client to display the second target area, the second target area including a plurality of to-be-processed objects in the virtual scene.

S142: When detecting the second target gesture performed on the first target object in the plurality of to-be-processed objects, the server controls the client to use the first target object in the virtual scene (optionally, the first target object may not be used in the virtual scene as required, that is, in S142, the first target object is not used in the virtual scene), display the first target object in the third target area in the virtual scene, and hide the second target area in the virtual scene.

S11 to S12 include an implementation process of the technical solutions of the present disclosure. In this implementation process, the terminal 104 handles the object processing. The data processing method performed in S12 is performed by the terminal 104.

Further, S11, S13, and S14 include another implementation process of the technical solutions of the present disclosure. In this implementation process, the terminal 104 uploads related data to the server 102, and the server 102 dominates the object processing and controls the terminal 104 to perform the object processing. In other words, the object processing method performed in S14 is implemented by the server 102 by controlling the client.

In one embodiment, the solution is exemplarily applied to an FPS game.

Figure 2:
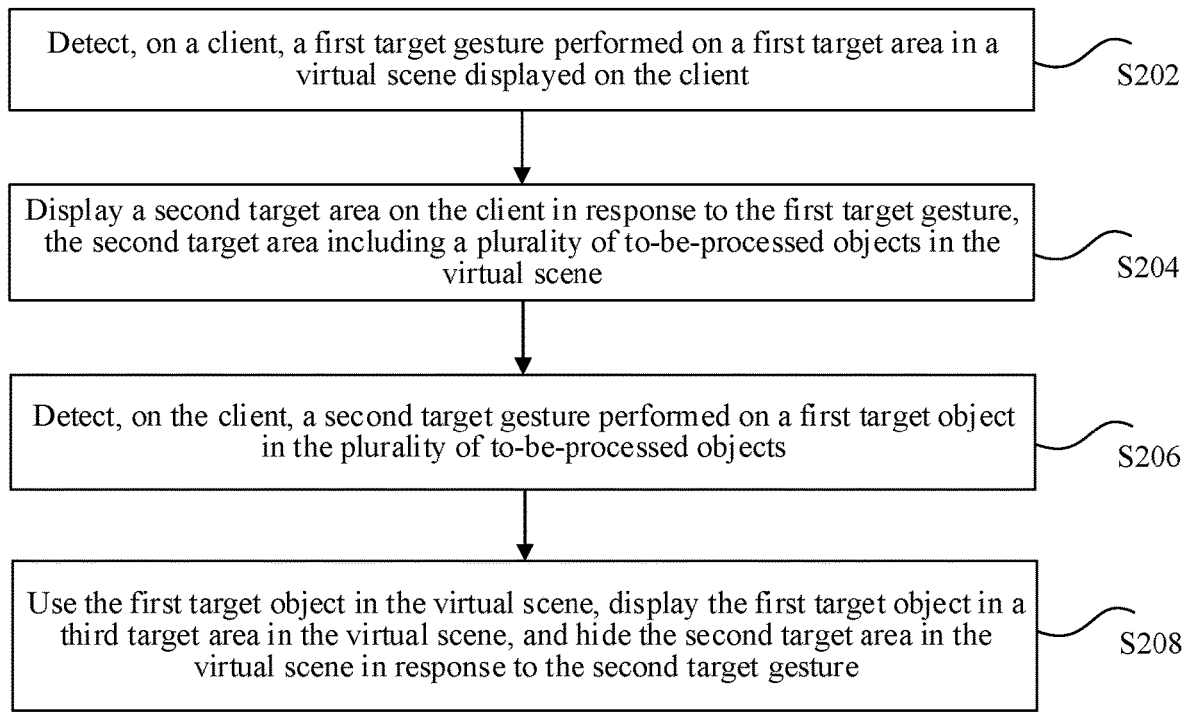
FIG. 2 is a flowchart of an object processing method according to an embodiment of the present disclosure.

FIG. 2 is a flowchart of an object processing method according to an embodiment of the present disclosure. As shown in FIG. 2, the method may be applied to a terminal, and includes the followings.

S202: Detect, on a client, a first target gesture performed on a first target area in a virtual scene displayed on the client.

In the technical solution provided in S202 of the present disclosure, the client may be an FPS client. The virtual scene may be a game scene with a tight rhythm and high requirements on operation efficiency. For example, the game scene is a scene in a first-person shooting game (FPS), and the first target area is an area in the virtual scene for receiving a first target gesture, for example, an operation panel, and may include a virtual button, for example, an indication button for indicating an operation. The button may be an arrow button for indicating unfolding of an object, or may include an operation area for receiving continuous operations, including an operation area for receiving sliding operations, for example, an expansion bar area, etc.

The first target gesture performed on the first target area in the virtual scene displayed on the client is detected on the client. The first target gesture may be a tap gesture or a sliding gesture. For example, the tap gesture may be a single tap gesture, a double tap gesture, etc. The sliding gesture may be an upward sliding gesture, a downward sliding gesture, a leftward sliding gesture, a rightward sliding gesture, etc.

Optionally, the first target gesture may be a gesture in contact with a screen or a gesture in no contact with the screen. The gesture in contact with the screen may be detected by a touch sensor, and the gesture in no contact with the screen may be detected by an optical sensor, helping a user perform operations.

S204: Display a second target area on the client in response to the first target gesture, the second target area including a plurality of to-be-processed objects in the virtual scene.

After the first target gesture performed on the first target area in the virtual scene displayed on the client is detected on the client, the second target area is displayed on the client in response to the first target gesture, the second target area including a plurality of to-be-processed objects in the virtual scene.

In one embodiment, the first target gesture is used for triggering displaying, on the client, of the second target area including the plurality of to-be-processed objects in the virtual scene, that is, as long as the first target gesture performed on the first target area of the client is detected on the client, the second target area including the plurality of to-be-processed objects in the virtual scene may be displayed on the client in response to the first target gesture. The plurality of to-be-processed objects may be displayed on the second target area of the client in a form of a vertical list.

Optionally, the to-be-processed object is an item, a prop, etc., in the virtual scene. The item may be a virtual attack accessory equipment to be equipped on a virtual attack equipment in the virtual scene. For example, the item includes one or more different types of tools to be equipped, such as medicines, magnification mirrors, bullets, etc., that may be used for configuring the virtual attack equipment in the virtual scene. The virtual attack equipment is a virtual control object in the virtual scene, which may be attack equipment in the virtual scene such as a virtual firearm or pan, etc.

In one embodiment, the first target gesture may be received on the client to trigger displaying areas in the second target area. All of the areas may fall within a range of the first target area.

S206: Detect, on the client, a second target gesture performed on a first target object in the plurality of to-be-processed objects.

In the technical solution provided in S206 of the present disclosure, after the second target area is displayed on the client in response to the first target gesture, the second target gesture performed on the first target object in the plurality of to-be-processed objects is detected on the client.

In one embodiment, after the second target area is displayed on the client in response to the first target gesture, the first target object in the plurality of to-be-processed objects may be determined. Optionally, the first target object is an object used in a virtual scene by a virtual character controlled by an account used for logging into the client or an object that needs to be displayed by using a shortcut. For example, the first target object is a shortcut item used in the virtual scene.

The second target gesture in one embodiment may be a tap gesture performed on the first target object, for example, a single tap gesture or a double tap gesture performed on the first target object. After the first target object is determined from the plurality of to-be-processed objects, it may be detected on the client whether the second target gesture is performed on the first target object. If it is detected on the client that the second target gesture is performed on the first target object, S208 is performed.

S208: Use the first target object in the virtual scene, display the first target object in a third target area in the virtual scene, and hide the second target area in the virtual scene in response to the second target gesture.

In the technical solution provided in S208 of the present disclosure, after the second target gesture performed on the first target object in the plurality of to-be-processed objects is detected on the client, the first target object is used in the virtual scene, the first target object is displayed in the third target area in the virtual scene, and the second target area is hidden in the virtual scene in response to the second target gesture.

The third target area in one embodiment is a shortcut display area of the client, and may include a first target area for displaying objects in a virtual scene that may be processed by using a shortcut. If it is detected that the second target gesture is performed on the first target object, the first target object is used in the virtual scene, the first target object is displayed in the third target area in the virtual scene, and the second target area is hidden in the virtual scene. Using the first target object in the virtual scene may be using the first target object and the virtual control object in combination in the virtual scene. Before the first target object is displayed in the target area, other objects requiring shortcut operations may be displayed. When the second target gesture performed on the first target object is detected, the object originally displayed in the third target area may be replaced with the first target object, and second target areas of the plurality of to-be-processed objects in the virtual scene are directly hidden in the virtual scene, so that using of the first target object in the virtual scene, displaying of the first target object in the third target area in the virtual scene, and hiding of the second target area in the virtual scene are simultaneously triggered through the first target gesture, avoiding multi-step operations of separately selecting and using the first target object and hiding the second target area, thereby simplifying processing of the target object. In one embodiment, the original four steps: panel unfolding through tapping, object selection, panel folding, and use of an object can be simplified into two steps: panel unfolding through tapping and object selection. During object selection, a panel is folded and the object is used, simplifying processing of the target object. In addition, the client has a simple and beautiful interface, improving user experience.

For example, the plurality of to-be-processed objects, in one embodiment, include different types of medicines, such as a medicine 1, a medicine 2, a medicine 3, and a medicine 4. When the first target gesture performed on the first target area in the virtual scene displayed on the client is detected on the client, a second target area including icons of the medicine 1, the medicine 2, the medicine 3, and the medicine 4 is displayed on the client. The medicine 3 is the first target object. When a second target gesture performed on the medicine 3 is detected, the following operations are simultaneously performed: using the medicine 3 in the virtual scene, displaying the medicine 3 in the third target area in the virtual scene by using a shortcut, and hiding, in the virtual scene, the second target area including the icons of the medicine 1, the medicine 2, and the medicine 4, that is, hiding the icons of the medicine 1, the medicine 2, and the medicine 4 on the interface of the client. Therefore, the medicine 3, the medicine 1, the medicine 2, and the medicine 4 on the client may be simultaneously processed through the second target gesture, avoiding multi-step operations of separately selecting and using the medicine 3 and hiding the medicine 1, the medicine 2, and the medicine 4, thereby simplifying processing of the target object.

In one embodiment, when the second target gesture performed on the first target object is detected, the first target object is displayed in the third target area of the client, the second target area is displayed on the client, and the first target object is used in the virtual scene. In addition to the above, other operations may be further performed in the virtual scene. No limitation is imposed.

Through S202 to S208, the first target gesture performed on the first target area in the virtual scene displayed on the client is detected on the client; the second target area is displayed on the client in response to the first target gesture, the second target area including the plurality of to-be-processed objects in the virtual scene; the second target gesture performed on the first target object in the plurality of to-be-processed objects is detected on the client; and the first target object is used in the virtual scene, the first target object is displayed in the third target area in the virtual scene, and the second target area is hidden in the virtual scene in response to the second target gesture. When the second target gesture performed on the first target object in the plurality of to-be-processed objects is detected, the first target object is used in the virtual scene, and the first target object is displayed in the third target area in the virtual scene, and the second target area is hidden in the virtual scene. That is, processing of the target object on the client can be simultaneously performed through the second target gesture, so that multi-step operations of separately selecting and using the first target object and hiding the second target area are avoided, thereby simplifying processing of the target object, resolving the technical problem that processing of the target object is complex in the related art.

In one embodiment, S208 of displaying the first target object in the third target area in the virtual scene includes: replacing a second target object displayed in the third target area with the first target object, the second target object being displayed in the third target area before the first target gesture performed on the first target area is detected on the client; or displaying both the first target object and the second target object in the third target area.

In one embodiment, before the first target object is displayed, the third target area may display other objects that require a shortcut operation in the virtual scene. In one embodiment, the second target object is an object that has been displayed in the third target area and requires a shortcut operation in the virtual scene before the first target gesture performed on the first target area is detected on the client. During displaying of the first target object in the third target area in the virtual scene, the second target object may be replaced with the first target object, or the second target object may be retained, and both the first target object and the second target object may be displayed in the third target area, helping a user quickly select the first target object and the second target object, improving efficiency of processing the target object.

In one embodiment, S202 of detecting, on the client, the first target gesture performed on the first target area in the virtual scene displayed on the client includes: detecting, on the client, a single tap gesture or a double tap gesture performed on a target indication button, the first target area in the virtual scene displayed on the client including an area in which the target indication button is displayed in the virtual scene, and the first target gesture including the single tap gesture or the double tap gesture; or detecting, on the client, a sliding gesture performed on the third target area, the first target area in the virtual scene displayed on the client including the third target area, and the first target gesture including the sliding gesture.

In one embodiment, the first target area includes the area in which the target indication button is displayed in the virtual scene, and the target indication button is used for indicating an operation to be performed in the virtual scene. For example, the target indication button is a virtual indication button with an expansion identifier displayed in the virtual scene of the client. The expansion identifier may be an arrow identifier used for indicating that the second target area including the plurality of to-be-processed objects in the virtual scene is to be displayed through unfolding after an operation is performed on the target instruction button. In one embodiment, the first target gesture may include a single tap gesture or a double tap gesture, and when a single tap gesture or a double tap gesture performed on the target indication button is detected on the client, the second target area including the plurality of to-be-processed objects is played on the client.

In one embodiment, the first target area may further include a third target area. The third target area is an area for displaying an object that requires a shortcut operation in an item selection bar. A sliding gesture performed on the third target area is detected on the client. The second target area including the plurality of to-be-processed objects in the virtual scene is displayed on the client in response to the sliding gesture. The sliding gesture has a sliding direction, which may be any one of an upward direction, a downward direction, a leftward direction, a rightward direction, etc. No limitation is imposed.

The single tap gesture or the double tap gesture performed on the target indication button and the sliding gesture performed on the third target area are exemplary implementations of one embodiment of the present disclosure, but do not represent that the gesture performed on the first target area includes only a single tap gesture, a double tap gesture, or a sliding gesture. Any gesture that may be used for triggering displaying, on the client, of the second target area including the plurality of to-be-processed objects in the virtual scene falls within the range of the present disclosure.

In one embodiment, S208 of using the first target object in the virtual scene, displaying the first target object in the third target area in the virtual scene, and hiding the second target area in the virtual scene includes: during use of the first target object, displaying the first target object in the third target area in the virtual scene and hiding the second target area in the virtual scene.

In one embodiment, when the first target object is to be used in the virtual scene, the first target object is to be displayed in the third target area in the virtual scene, and the second target area is to be hidden in the virtual scene, during use of the first target object in the scene, for example, during use of a medicine in the virtual scene, the first target object is displayed in the third target area in the virtual scene, and the second target area is hidden in the virtual scene. Optionally, information about "in use" is displayed in the virtual scene of the client to indicate that the first target object is currently being used in the virtual scene.

In one embodiment, after S208 of using the first target object in the virtual scene, displaying the first target object in the third target area in the virtual scene, and hiding the second target area in the virtual scene, the method further includes: after the first target object is used up in the virtual scene, displaying a fourth target object in a plurality of third target objects in the third target area, the third target object being an object in the plurality of to-be-processed objects other than the first target object.

In one embodiment, after the first target object is used up in the virtual scene, optionally, after there is no first target object in the virtual scene, the first target object is no longer displayed in the third target area. In this case, a fourth target object in a plurality of third target objects may be displayed in the third target area as a shortcut object in the virtual scene. For example, the first target object is a medicine. After the medicine is used up in the virtual scene, the medicine is no longer displayed in the third target. An item is selected from remaining items to replace the medicine to be displayed in the third target area, or both the selected item and the medicine are displayed in the third target area, to ensure that an shortcut object in the virtual scene can be always displayed in the third target area, helping a player perform operations, thereby improving the efficiency of processing the target object.

In one embodiment, before the fourth target object in the plurality of third target objects is displayed in the third target area, the method further includes: obtaining at least information about a virtual control object in the virtual scene, information about each of the third target objects, and historical status information between the virtual control object and each of the third target objects, the historical status information being used for indicating a number of times each of the third target objects and the virtual control object are being used in combination in the virtual scene in a past period of time; determining, according to at least the information about the virtual control object, the information about each of the third target objects, and the historical status information, a probability that each of the third target objects and the virtual control object are to be used in combination in the virtual scene; and determining, as the fourth target object, a third target object with a highest probability to be used in combination with the virtual control object in the virtual scene.

In one embodiment, before the fourth target object in the plurality of third target objects is displayed in the third target area, the fourth target object may be selected from the plurality of third target objects. At least the information about the virtual control object of the virtual scene, the information about each of the third target objects, and the historical status information between the virtual control object and each of the third target objects may be obtained. The information about the virtual control object may be a blood volume of a virtual character in the virtual scene. The information about each of the third target objects may be used for indicating a possessing status of each of the third target objects by the virtual control object, or may be used for indicating an obtaining status by the virtual control object in a past period of time. The historical status information may be used for indicating the number of times each of the third target objects and the virtual control object in the virtual scene are being used in combination in the virtual scene in the past period of time. The historical status information may be further frequency of being used in combination with the virtual control object in the virtual scene through the second target object in the virtual scene.

After at least the information about the virtual control object of the virtual scene, the information about each of the third target objects, and the historical status information between the virtual control object and each of the third target objects are obtained, the probability that each of third target objects and the virtual control object are to be used in combination in the virtual scene is determined according to at least the information about the virtual control object, the information about each of the third target objects, and the historical status information. The probability is used for indicating a possibility that each of the third target objects and the virtual control object are to be used in combination in the virtual scene. The third target object with the highest probability to be used in combination with the virtual control object in the virtual scene is determined as the fourth target object.

Optionally, in one embodiment, data such as a player selection, a current item possessing status, a current player status, and usage, use frequency, and obtaining history of a player, etc., is comprehensively considered, and is reported to the server. Big data analysis may be performed through the server for performing intelligent sorting, so as to avoid a fixed sorting manner. Therefore, a player may automatically select a currently more suitable shortcut item in most cases. A third target object that is most likely to be used by the virtual control objects and that can enhance experience of a player corresponding to the virtual control object is determined from the plurality of third target objects as the fourth target object.

In one embodiment, the determining, as the fourth target object, a third target object with a highest probability to be used in combination with the virtual control object in the virtual scene includes: sorting the plurality of third target objects in a target order according to the probability that each of the third target objects and the virtual control object are to be used in combination in the virtual scene, the target order being used for indicating a descending order or an ascending order of probabilities of the plurality of third target objects; and determining, as the fourth target object, the third target object in the plurality of sorted third target objects with the highest probability.

In one embodiment, when the third target object with the highest probability to be used in combination with the virtual control object in the virtual scene is determined as the fourth target object, the plurality of the third target objects may be sorted in a target order according to the probability that each of the third target objects and the virtual control object are to be used in combination in the virtual scene. The target order may be used for indicating a descending order or an ascending order of the probabilities of the plurality of third target objects, to implement intelligent sorting of the plurality of third target objects according to the probability that each of the third target object and the virtual control object are to be used in combination in the virtual scene, thereby determining the third target object with the highest probability from the plurality of third target objects as the fourth target object. Compared to fixed sorting, a player can make more correct selections and fewer manual adjustments are required through the sorting, improving the efficiency of processing the target object.

In one embodiment, the information about the virtual control object includes: attribute information of the virtual control object used for indicating a current attribute of the virtual control object. The information about each of the third target objects includes at least one of the following: a quantity of the third target objects; a type of each of the third target objects; whether each of the third target objects is currently selected to be used, in the virtual scene, in combination with the virtual control object in the virtual scene; and whether each of the third target objects is currently being used, in the virtual scene, in combination with the virtual control object in the virtual scene.

In one embodiment, the information about each of the third target objects may include the number of the third target objects. The number may include a number of items possessed by the virtual control object, for example, a number of possessed medicines. The information about each of the third target objects may further include the type of each of the third target objects, for example, a type of the medicine, and may further include information about whether each of the third target objects is currently selected, so that the third target object and the virtual control object in the virtual scene are being used in combination in the virtual scene, and may further include whether each of the third target objects is currently being used, in the virtual scene, in combination with the virtual control object in the virtual scene, for example, information about whether the third target object is configured on the virtual control object.

The above information required for intelligently sorting the plurality of third target objects and determining the fourth target object from the plurality of sorted third target objects is merely an exemplary implementation, and does not mean that the information required for intelligently sorting the plurality of third target objects and determining the fourth target object from the plurality of sorted third target objects includes only the above information. Any information that can be used for intelligently sorting the plurality of third target objects and helping a player determine a currently more suitable fourth target object falls within the scope of the present disclosure.

In one embodiment, the second target gesture includes at least one of the following: a single tap gesture performed on the first target object; a double tap gesture performed on the first target object; and a sliding gesture performed on the first target object.

In one embodiment, the second target gesture performed on the first target object may be a single tap gesture performed on the first target object, for example, a player performs single tapping on an icon of the first target object with a finger. The second target gesture may also be a double tap gesture performed on the first target object, for example, a player performs double tapping on the icon of the first target object with a finger. The second target gesture may also be a sliding gesture performed on the first target object, for example, the player slides the icon of the first target object with a finger in a specific direction, for example, slides the icon toward the third target area.

The single tap gesture, the double tap gesture, and the sliding gesture included in the second target gesture are merely exemplary implementations, and do not mean that the second target gesture in includes only the above gestures. Any gesture that can be used for triggering use of the first target object in the virtual scene, displaying of the first target object in the third target area in the virtual scene, and hiding of the second target area in the virtual scene falls within the scope of the present disclosure.

In one embodiment, S202 of detecting, on the client, the first target gesture performed on the first target area in the virtual scene displayed on the client includes: detecting, on a first-person shooting game (FPS) client, the first target gesture performed on the first target area in the virtual scene displayed on the client, the client including the FPS client. S204 of displaying the second target area on the client in response to the first target gesture includes: displaying the second target area on the FPS client in response to the first target gesture, the second target area including a plurality of virtual attack accessory equipment in the virtual scene. S206 of detecting, on the client, the second target gesture performed on the first target object in the plurality of to-be-processed objects includes: detecting, on the FPS client, the second target gesture performed on a first virtual attack accessory equipment in the plurality pieces of virtual attack accessory equipment, the plurality of to-be-processed objects including the plurality of virtual attack accessory equipment, and the first target object including the first virtual attack accessory equipment. S208 of using the first target object in the virtual scene, displaying the first target object in the third target area in the virtual scene, and hiding the second target area in the virtual scene in response to the second target gesture includes: using the first virtual attack accessory equipment in the virtual scene, displaying the first virtual attack accessory equipment in the third target area in the virtual scene, and hiding the second target area in the virtual scene in response to the second target gesture.

The object processing method in one embodiment may be applied to a first-person shooting game (FPS) game. The first target object may be a to-be-processed object in the FPS game, or may be a virtual attack accessory equipment to be equipped on a virtual attack equipment in the FPS game. For example, if the virtual attack equipment is a virtual firearm, the first target object may be a magnification mirror, a bullet, or other virtual attack accessory equipment mounted on the virtual firearm.

The client in one embodiment may include an FPS client, and the first target gesture performed on the first target area in the virtual scene displayed on the client may be detected on the first-person shooting game FPS client. The first target gesture performed on the first target area in the virtual scene displayed on the client may be detected on an interface on which the to-be-processed object of the FPS game is displayed.

The plurality of to-be-processed objects in one embodiment include a plurality of virtual attack accessory equipment. After the first target gesture performed on the first target area in the virtual scene displayed on the FPS client is detected on the FPS client, the second target area including the plurality of virtual attack accessory equipment is displayed on the FPS client in response to the first target gesture, and then a first virtual attack accessory equipment is determined from the plurality of virtual attack accessory equipment displayed in the second target area. When a second target gesture performed on the first virtual attack accessory equipment in the plurality of virtual attack accessory equipment is detected on the FPS client, the first virtual attack accessory equipment is used in the virtual scene, and the first virtual attack accessory equipment is displayed in the third target area in the virtual scene, and the second target area is hidden in the virtual scene.

In one embodiment, when the second target gesture performed on the first virtual attack accessory equipment in the plurality of virtual attack accessory equipment is detected, the first virtual attack accessory equipment may be used in the virtual scene, the first virtual attack accessory equipment may be displayed in the third target area in the virtual scene, and the second target area may be hidden in the virtual scene, that is, processing of the virtual attack accessory equipment on the FPS client can be simultaneously performed through the second target gesture, so that multi-step operations of separately selecting and using the first virtual attack accessory equipment and hiding the second target area are avoided, thereby simplifying processing of the virtual attack accessory equipment.

In one embodiment, after S208 of using the first target object in the virtual scene, displaying the first target object in the third target area in the virtual scene, and hiding the second target area in the virtual scene in response to the second target gesture, the method further includes: displaying, on an item interaction interface of the virtual scene or in the virtual scene, an operation result of using the first target object in the virtual scene, displaying the first target object in the third target area in the virtual scene, and hiding the second target area in the virtual scene in response to the second target gesture, the operation result being used for indicating use of the first target object in the virtual scene, displaying of the first target object in the third target area in the virtual scene, and hiding of the second target area in the virtual scene.

In one embodiment, after the first target object is used in the virtual scene, the first target object is displayed in the third target area in the virtual scene, and the second target area is hidden in the virtual scene in response to the second target gesture, an operation result of using the first target object in the virtual scene, displaying the first target object in the third target area in the virtual scene, and hiding the second target area in the virtual scene may be displayed on an item interaction interface. The item interaction interface displays a plurality of to-be-processed objects, and may be an interface of a virtual container, for example, an interface of a backpack. The operation result is used for indicating that the first target object is used in the virtual scene, the first target object is displayed in the virtual scene in the third target area, and the second target area is hidden in the virtual scene.

In one embodiment, the operation result of using the first target object in the virtual scene, displaying the first target object in the third target area in the virtual scene, and hiding the second target area in the virtual scene may be displayed in the virtual scene. The virtual scene may be a battle scene. In one embodiment, the operation result expressed in text information, picture information, etc. is displayed in the virtual scene in which the virtual control object is located, to indicate that the first target object is used in the virtual scene, the first target object is displayed in the third target area in the virtual scene, and the second target area is hidden in the virtual scene.

In one embodiment, button operation is limited in the game. When the second target gesture is detected, at least operations of replacement of shortcut bar (third target area) setting and folding of selection bar (hiding of the second target area) can be simultaneously performed. In this way, a player is to perform fewer steps with fewest buttons, simplifying processing of the target object, and meeting an urgent need of the player to quickly select and use items. Processing is more proper in case of a plurality of items, relieving contradiction between operation convenience for a player and a simple and beautiful interface.

An embodiment of the present disclosure further provides another object processing method.

Figure 3:
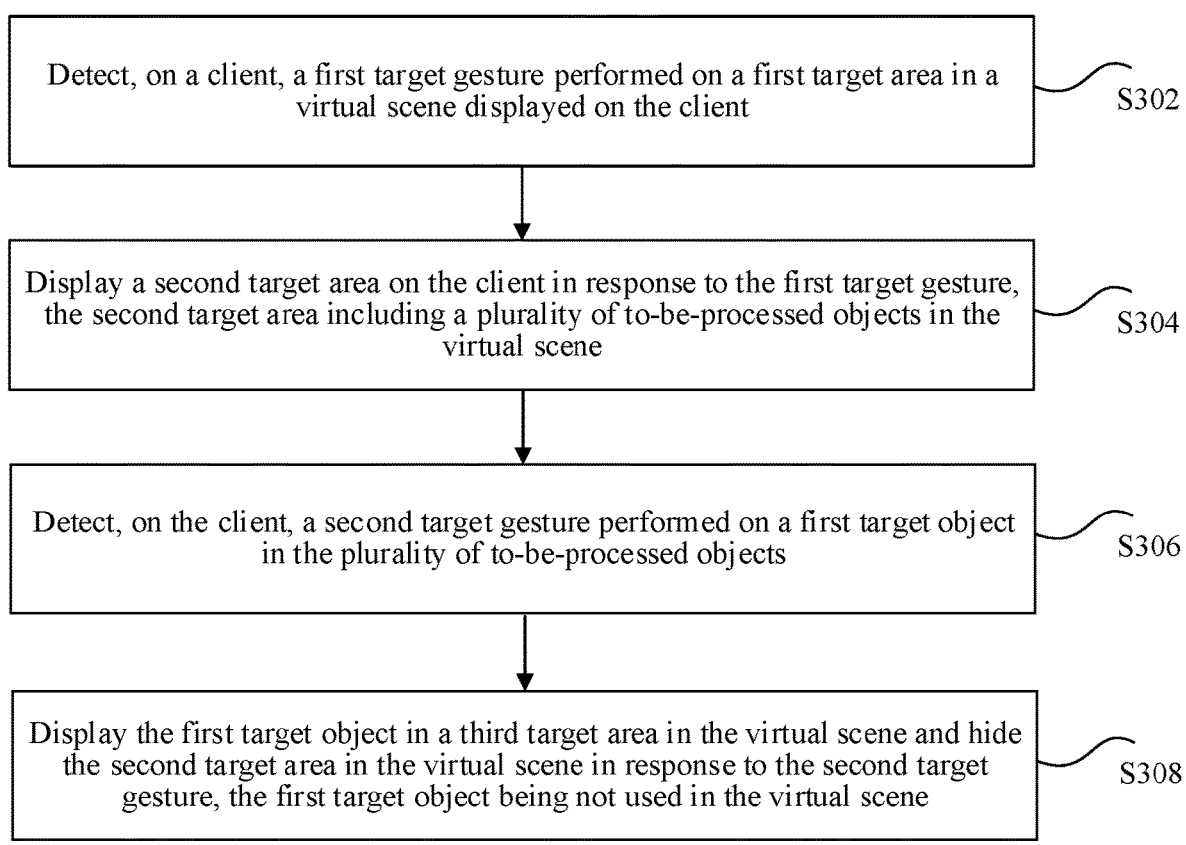
FIG. 3 is a flowchart of another object processing method according to an embodiment of the present disclosure.

FIG. 3 is a flowchart of another object processing method according to an embodiment of the present disclosure. As shown in FIG. 3, the method is applied to a terminal, and includes the followings.

S302: Detect, on a client, a first target gesture performed on a first target area in a virtual scene displayed on the client.

In the technical solution provided in S302 of the present disclosure, the first target gesture performed on the first target area in the virtual scene displayed on the client is detected on the client. The first target gesture may be a tap gesture, or may be a sliding gesture.

Optionally, the first target gesture may be a gesture in contact with a screen or a gesture in no contact with the screen. The gesture in contact with the screen may be detected by a touch sensor, and the gesture in no contact with the screen may be detected by an optical sensor, helping a user perform operations.

S304: Display a second target area on the client in response to the first target gesture, the second target area including a plurality of to-be-processed objects in the virtual scene.

In the technical solution provided in S304 of the present disclosure, after the first target gesture performed on the first target area in the virtual scene displayed on the client is detected on the client, the second target area is displayed on the client in response to the first target gesture, the second target area including a plurality of to-be-processed objects in the virtual scene.

In one embodiment, as long as the first target gesture performed on the first target area of the client is detected on the client, the second target area including the plurality of to-be-processed objects in the virtual scene may be displayed on the client in response to the first target gesture. The plurality of to-be-processed objects may be displayed on the second target area of the client in a form of a list.

Optionally, the to-be-processed object is an item, a prop, etc. in the virtual scene. The item may be a virtual attack accessory equipment to be equipped on a virtual attack equipment in the virtual scene. The virtual attack equipment is a virtual control object in the virtual scene, which may be attack equipment in the virtual scene such as a virtual firearm, a pan, etc.

S306: Detect, on the client, a second target gesture performed on a first target object in the plurality of to-be-processed objects.

In the technical solution provided in S306 of the present disclosure, after the second target area is displayed on the client in response to the first target gesture, the second target gesture performed on the first target object in the plurality of to-be-processed objects is detected on the client.

In one embodiment, after the second target area is displayed on the client in response to the first target gesture, the first target object in the plurality of to-be-processed objects may be determined.

The second target gesture in one embodiment may be a heavy press gesture or a touch and hold gesture performed on the first target object. After the first target object is determined from the plurality of to-be-processed objects, it may be detected on the client whether the second target gesture is performed on the first target object. If it is detected on the client that the second target gesture is performed on the first target object, S308 is performed.

S308: Display the first target object in a third target area in the virtual scene and hide the second target area in the virtual scene in response to the second target gesture, the first target object being not used in the virtual scene.

In the technical solution provided in S308 of the present disclosure, when the second target gesture performed on the first target object is detected on the client, the first target object is displayed in the third target area of the client, and the second target area is hidden on the client, but the first target object is not used in the virtual scene, that is, when the second target gesture on the first target object is detected on the client, only the first target object is displayed in the third target area of the client and the second target area is hidden on the client, but the first target object is not used directly. A player may select and use a first virtual attack accessory equipment according to a subsequent requirement in the virtual scene, improving flexibility of processing the target object.

In one embodiment, the second target gesture includes one of the following: a touch-and-press gesture performed on the first target object according to a first force, the first force being greater than a first target threshold; a touch-and-press gesture performed on the first target object according to a second force, the second force being not greater than the first target threshold; a touch-and-press gesture continuously performed on the first target object according to target duration, the target duration being greater than a second target threshold.

In one embodiment, a screen of the client may sense different pressing levels, and a multi-touch (3D-touch) technology may be applied. The second target gesture performed on the first target object in the plurality of to-be-processed objects may be the touch-and-press gesture performed on the first target object according to the first force. The first force is greater than the first target threshold. The first target threshold may be used for determining whether the first force is enough to form heavy pressing on the first target object. When the first force is greater than the first target threshold, heavy pressing is performed on the first target object. The second target gesture in one embodiment may also be the touch-and-press gesture performed on the first target object according to the second force. The second force is not greater than the first target threshold, that is, the second touch-and-press gesture is a moderate press gesture. The second target gesture in one embodiment may also be the touch-and-press gesture continuously performed on the first target object according to the target duration. The target duration is greater than the second target threshold. The second target threshold is used for determining whether the touch-and-press gesture performed on the first target object is a touch and hold gesture. When the target duration is greater than the second target threshold, it is determined that the second target gesture is a touch and hold gesture.

Optionally, in one embodiment, for hardware that does not support 3D-touch, a touch start event (OnTouchStarted) and a touch end event (OnTouchEnded) may be reloaded in a derived control (QUWidget) blueprint. Setting of the first target object in the second target area, for example, setting of an item in a shortcut bar is implemented through time control and processing.

The touch-and-press gesture performed on the first target object according to the first strength, the touch-and-press gesture performed on the first target object according to the second force, and the touch-and-press gesture continuously performed on the first target object according to the target time included in the second target gesture in one embodiment are merely exemplary implementations, and do not mean that the second target gesture includes only the above gestures. Any gesture that can be used to trigger displaying of the first target object in the second target area of the client and hiding of the second target object on the client.

In one embodiment, S302 of detecting, on the client, the first target gesture performed on the first target area in the virtual scene displayed on the client includes: detecting, on a first-person shooting game (FPS) client, the first target gesture performed on the first target area in the virtual scene displayed on the client, the client including the FPS client. S304 of displaying the second target area on the client in response to the first target gesture includes: displaying the second target area on the FPS client in response to the first target gesture, the second target area including a plurality of virtual attack accessory equipment in the virtual scene. S306 of detecting, on the client, the second target gesture performed on the first target object in the plurality of to-be-processed objects includes: detecting, on the FPS client, the second target gesture performed on a first virtual attack accessory equipment in the plurality of virtual attack accessory equipment in the virtual scene, the plurality of to-be-processed objects including the plurality of virtual attack accessory equipment, and the first target object including the first virtual attack accessory equipment. S308 of displaying the first target object in the third target area in the virtual scene and hiding the second target area in the virtual scene in response to the second target gesture includes: displaying the first virtual attack accessory equipment in the third target area in the virtual scene, and hiding the second target area in the virtual scene in response to the second target gesture, the first virtual attack accessory equipment being not used in the virtual scene.

The object processing method in one embodiment may be applied to an FPS game. The first target object may be a to-be-processed object in the FPS game, or may be a virtual attack accessory equipment to be equipped on a virtual attack equipment.

The client in one embodiment may include an FPS client, and the first target gesture performed on the first target area in the virtual scene displayed on the client may be detected on the first-person shooting game FPS client. The first target gesture performed on the first target area in the virtual scene displayed on the client may be detected on an interface on which the to-be-processed object of the FPS game is displayed.

The plurality of to-be-processed objects in one embodiment include a plurality of virtual attack accessory equipment. After the first target gesture performed on the first target area in the virtual scene displayed on the first-person shooting game (FPS) client is detected on the client, the second target area including the plurality of virtual attack accessory equipment is displayed on the FPS client in response to the first target gesture, and then a first virtual attack accessory equipment is determined from the plurality of virtual attack accessory equipment. When a second target gesture performed on the first virtual attack accessory equipment in the plurality of virtual attack accessory equipment is detected on the FPS client, the first virtual attack accessory equipment is displayed in the third target area in the virtual scene, and the second target area is hidden in the virtual scene, the first virtual attack accessory equipment being not used in the virtual scene.

In one embodiment, when the second target gesture performed on the first virtual attack accessory equipment is detected on the FPS client, only the first virtual attack accessory equipment is displayed in the third target area of the FPS client and the second target area is hidden on the client, but the first virtual attack accessory equipment is not used. A player may select and use a first virtual attack accessory equipment according to a subsequent requirement in the virtual scene, improving flexibility of processing the target object.

The technical solution of the present disclosure is described below in combination with exemplary embodiments. Specifically, for example, the target object is as an item in a virtual scene.

The technical solution may be applied to a tactical competitive game, which is a new type of game based on a shooting game. A single game involves many participants, a map area is relatively large, players compete fairly, and opponents are gradually eliminated, only one team winning the game eventually. The main attacking way may be shooting combined with elements such as an item, item use, weapon equipping, terrain utilization, route change, which is more strategic. In the tactical competitive game, possessing a plurality of supplies is common.

In one embodiment, a shortcut bar for item use is deeply optimized for the case in which a player possesses a plurality of supplies.

In one embodiment, a fourth-generation unreal engine (Unreal Engine 4) may be used, and an environment is built by a development tool: Visual studio 2015, and Xcode 9 iOS, etc.

Figure 4:
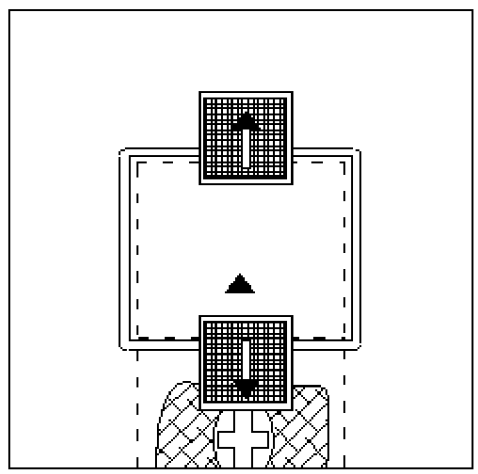
FIG. 4 is a schematic diagram of an arrow button according to an embodiment of the present disclosure.
Figure 5:
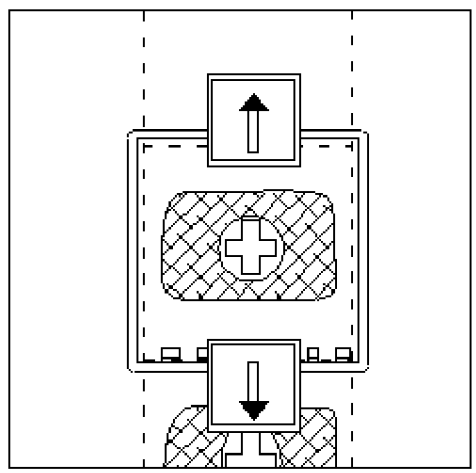
FIG. 5 is a schematic diagram of a button for placing an item according to an embodiment of the present disclosure.

FIG. 4 is a schematic diagram of an arrow button according to an embodiment of the present disclosure. FIG. 5 is a schematic diagram of a button for placing an item according to an embodiment of the present disclosure. As shown in FIG. 4 and FIG. 5, in one embodiment, during implementation of an item shortcut bar, controls UUserWidget and UButton may be used as elements, and VerticalBox or HorizontalBox may be used as a container.

Through arrow buttons shown in FIG. 4, folding and unfolding of a shortcut bar may be set. Through an input component bound to an object (a player controller), the shortcut bar may be adaptively folded when there is tapping outside the shortcut bar area, helping a player perform operations, thereby improving user experience. As shown in FIG. 5, in one embodiment, a control for placing items is inherited from the UUserWidget class, to obtain more suitable shortcut bar buttons (displaying of an item name, an item number, and an item icon, etc., and response of the buttons). During obtaining of supplies in a backpack in real time in each frame (tick), items are adaptively displayed in the above shortcut bar according to the number of items.

Figure 6:
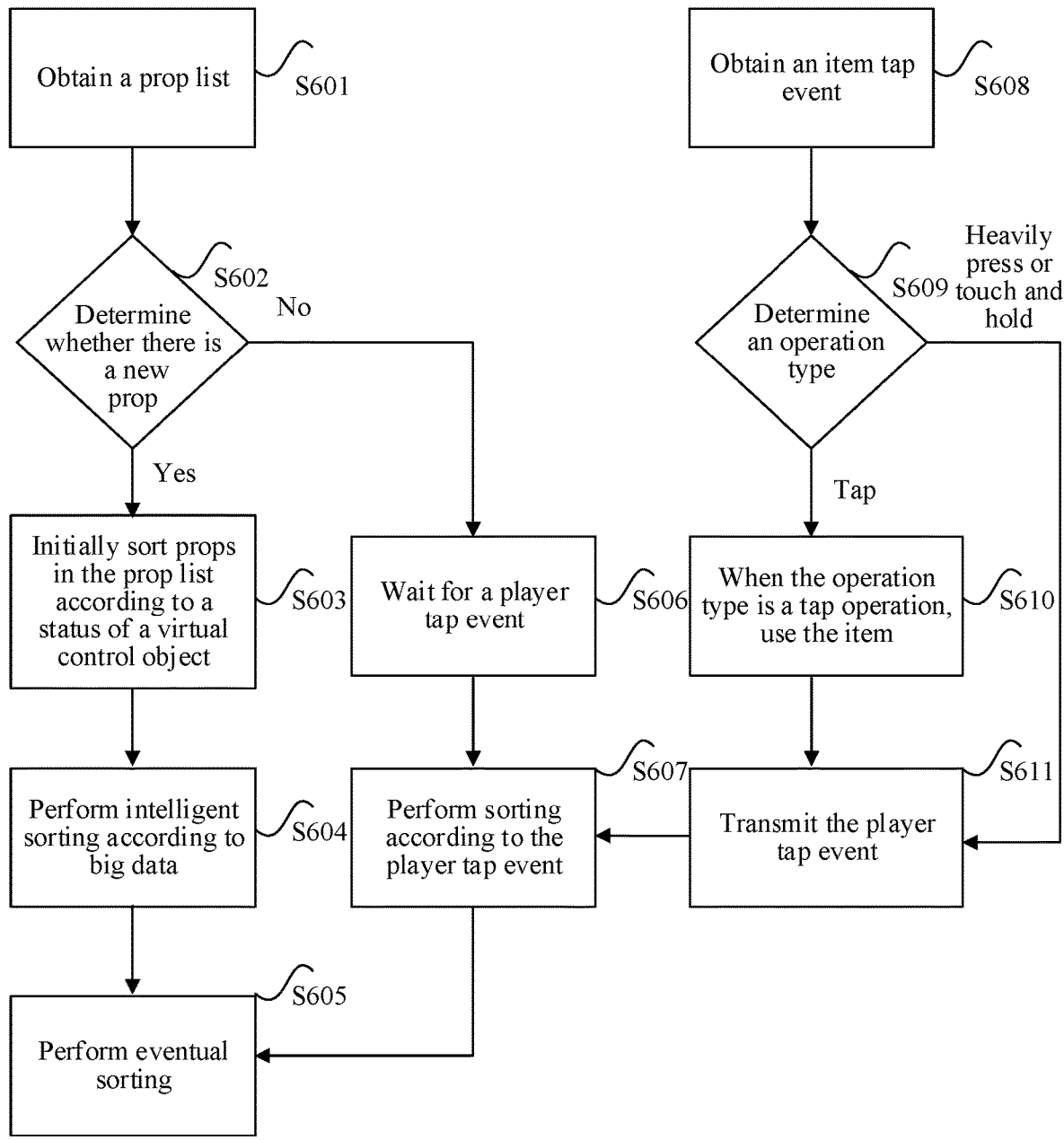
FIG. 6 is a flowchart of still another object processing method according to an embodiment of the present disclosure.

FIG. 6 is a flowchart of still another object processing method according to an embodiment of the present disclosure. As shown in FIG. 6, the method includes the following steps.

S601: Obtain a prop list.

The prop list in one embodiment may be displayed on an interface of a client, and may include to-be-equipped tools such as different types of medicines, magnification mirrors, and bullets, etc.

S602: Determine whether there is a new prop.

After the prop list is obtained, it is determined whether there is a new prop, for example, whether a prop is picked up in a virtual scene. If it is determined that there is a new prop, S603 is performed. If it is determined that there is no new prop, S606 is performed.

S603: Initially sort props in the prop list according to a status of a virtual control object.

If it is determined that there is a new prop, initial sorting is performed according to the status of the virtual control object. For example, the status of the virtual control object is a blood volume of the virtual control object in the virtual scene. In this case, the props in the prop list are initially sorted according to the blood volume of the virtual control object.

S604: Perform intelligent sorting according to big data.

After initial sorting according to a player status, intelligent sorting is performed according to big data. For example, data such as a player selection, current possessing of items, and a current player status is reported to a server, and big data analysis is performed through the server for intelligent sorting, thereby helping the player automatically select a currently more suitable shortcut item.

S605: Perform eventual sorting.

After intelligent sorting according to the big data, eventual sorting is performed. The big data is continuously corrected to continuously improve intelligent sorting.

S606: Wait for a player tap event.

If it is determined that there is no new prop, a player tap event is waited, that is, an event triggered by a tap operation performed by a player on the client is waited. A tap event on the prop in the prop list may be waited.

S607: Perform sorting according to the player tap event.

After the player tap event is waited, eventual sorting is performed according to the player tap event.

S608: Obtain an item tap event.

The item in one embodiment may be a medicine. The item tap event is obtained.

S609: Determine an operation type.

After a medicine tap event is obtained, a type of an operation performed by the player on the medicine is determined.

S610: When the operation type is a tap operation, use the item.

S611: Transmit the player tap event.

After the operation type is determined, the item is used and the player tap event is transmitted. Optionally, when the operation type is a heavy pressing operation or a touch and hold operation, the player tap event is directly transmitted.

After the player tap event is transmitted, S607 of sorting according to the player tap event is performed, and then S605 of eventual sorting is performed.

Figure 7:
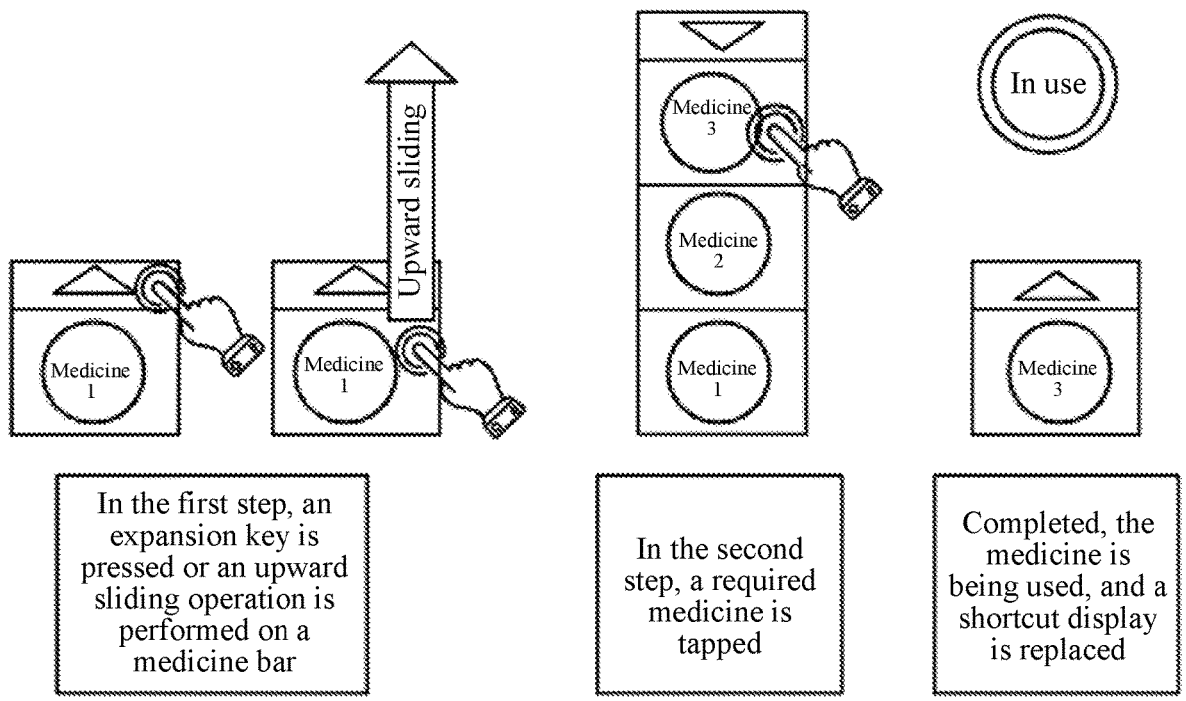
FIG. 7 is a schematic operation diagram of selecting and using medicines in an expansion bar according to an embodiment of the present disclosure.

FIG. 7 is a schematic operation diagram of selecting and using medicines in an expansion bar according to an embodiment of the present disclosure. As shown in FIG. 7, an operation of using a medicine in the expansion bar in one embodiment includes the following steps.

(1) an expansion key is pressed or an upward sliding operation is performed on a medicine bar.

The expansion key in one embodiment may be an arrow button. A player taps the arrow button or performs an upward operation on an item selection bar to unfold the item selection bar, so that a medicine 1, a medicine 2, and a medicine 3 are displayed.

(2) a required medicine is tapped. For example, an icon corresponding to medicine 3 is tapped.

(3) the operation is completed, the medicine 3 is being used, and a shortcut display is replaced.

In one embodiment, upon tapping of the medicine 3, operations of item use, replacement of the shortcut bar display, and folding of the selection bar are performed, simplifying selection and use of a non-current shortcut setting item, thereby improving efficiency of processing the target object.

Figure 8:
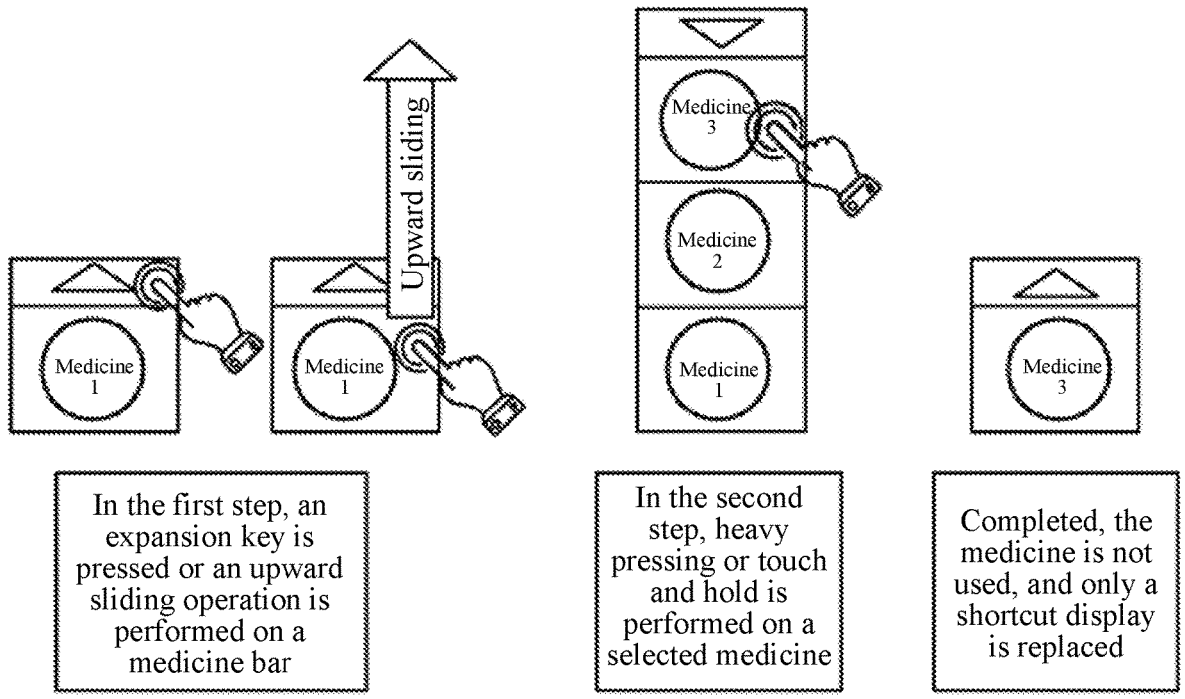
FIG. 8 is a schematic operation diagram of selecting but skipping using medicines in an expansion bar according to an embodiment of the present disclosure.

FIG. 8 is a schematic operation diagram of selecting but skipping using medicines in an expansion bar according to an embodiment of the present disclosure. As shown in FIG. 8, an operation of using a medicine in the expansion bar in one embodiment includes the following steps.

In the first step, an expansion key is pressed or an upward sliding operation is performed on a medicine bar.

The expansion key in one embodiment may be an arrow button. A player taps the arrow button or performs an upward operation on an item selection bar to unfold the item selection bar, so that a medicine 1, a medicine 2, and a medicine 3 are displayed.

In the second step, heavy pressing or touch and hold is performed on a selected medicine.

In one embodiment, heavy pressing or touch and hold may be performed on the selected medicine 3.

In the third step, the operation is completed, the medicine is not used, and only a shortcut display is replaced.

In one embodiment, if 3D-touch heavy pressing or touch and hold is used, only operations of shortcut bar setting replacement and selection bar folding are performed, and the selected item is not directly used. In most cases, two steps are omitted compared to original four steps of panel unfolding, object selection, panel folding, and use of an object, reducing 50% of the operation process, thereby simplifying processing of the target object and improving processing efficiency.

Optionally, in one embodiment, after a current shortcut item is used up, one is selected from remaining supplies to be filled in the shortcut bar. In the related art, a fixed sorting manner is used. In one embodiment, factors such as usage, use frequency, and obtaining history, etc. of a user are comprehensively considered for comprehensive sorting. Compared to fixed sorting in the existing solution, more correct selections can be made and times a player is required to perform manual adjustment on items are reduced through the sorting, thereby improving the efficiency of processing the target object.

Figure 9:
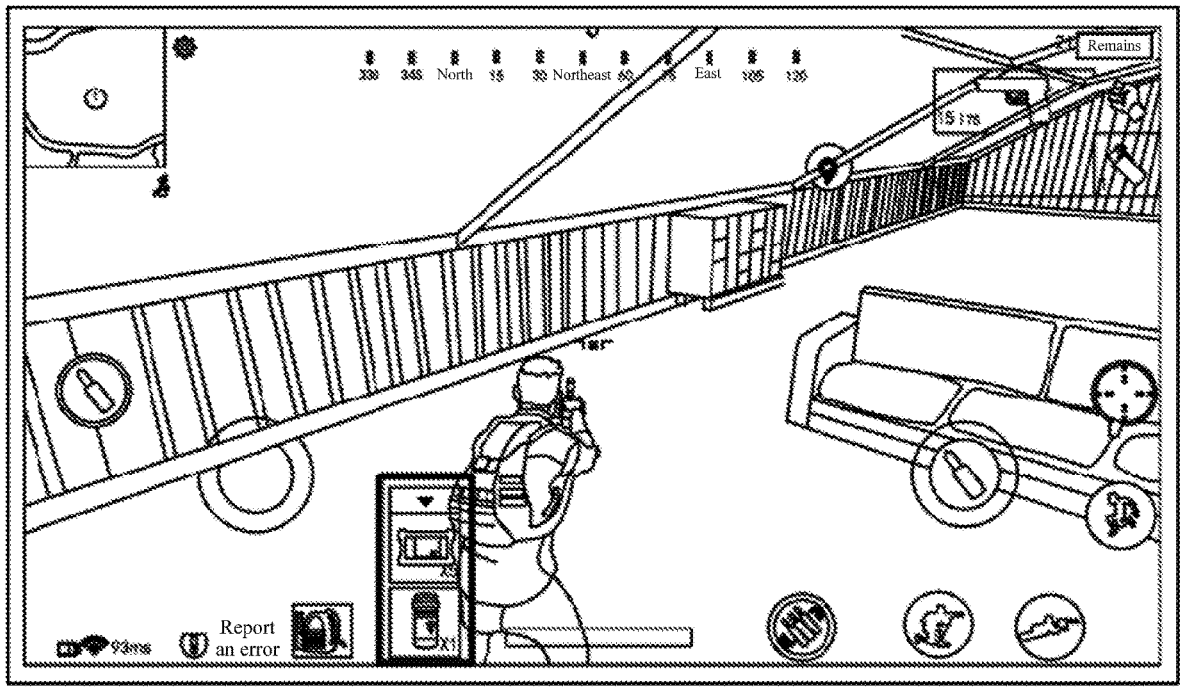
FIG. 9 is a schematic diagram of an object processing scenario according to an embodiment of the present disclosure.

FIG. 9 is a schematic diagram of an object processing scenario according to an embodiment of the present disclosure. As shown in FIG. 9, in one embodiment, an item shortcut bar is used, for example, a box shown by thick lines on the left of a central part in FIG. 9. A player taps an arrow button or performs an upward sliding operation on an item selection bar to unfold the item selection bar. Upon tapping of an item, operations of item use, replacement of shortcut bar setting, and folding of the selection bar are performed. If 3D-touch heavy pressing or touch and hold is used, only operations of item use and replacement of shortcut bar setting are performed, and the prop is not directly used.

In one embodiment, the case in which a player possesses a plurality of supplies may be deeply optimized. After a current shortcut item is used up, one is selected from remaining supplies to be filled in the shortcut bar. A medicine type may be recommended according to a current blood volume of the player, and data such as a selection of the player, a current possessing status, and a current player status, etc. is reported to a server for performing big data analysis and intelligent sorting, so that the player can automatically select a currently more suitable shortcut item in most cases. In addition, through continuous correction of big data, the intelligent sorting can be continuously improved.

Figure 10:
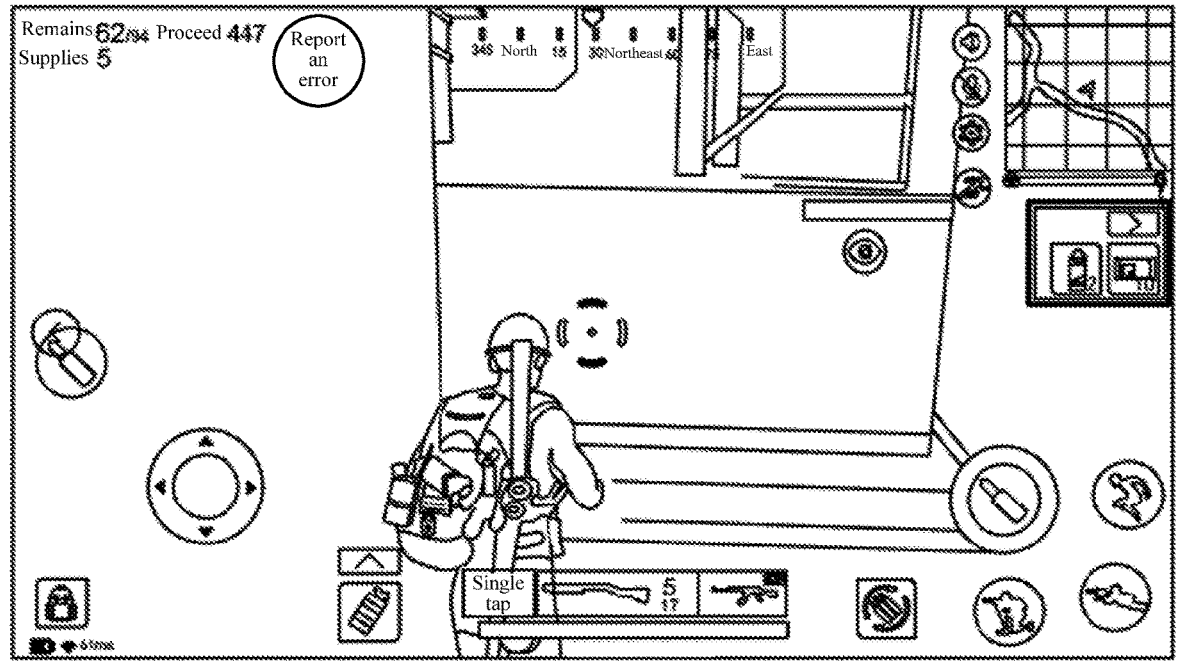
FIG. 10 is a schematic diagram of another object processing scenario according to an embodiment of the present disclosure.

FIG. 10 is a schematic diagram of another object processing scenario according to an embodiment of the present disclosure. As shown in FIG. 10, when there are a plurality of items, panel unfolding, object selection, panel folding, and use of an object need to be performed on a box indicated by thick lines in a central part on the right of the scenario shown in FIG. 10. Otherwise, the panel keeps unfolded, blocking view of a player. In addition, sorting of subsequent supplementary items is not intelligent enough after an item is used up, failing to meet player's requirements usually, and another manual adjustment is required. Using the solution shown in FIG. 9 can reduce two steps in each operation, in most cases, which is equivalent to reducing 50% of the operation, simplifying processing of a target object.

The game scenes and the game products applied in the object processing methods in the embodiments shown in FIG. 9 and FIG. 10 are merely an example, and do not mean that the game scenes and the game products are limited to the game scenes and game products shown in FIG. 9 and FIG. 10. The method may be further applied to other game products such as a client game, a web game, and a host game, etc.

In one embodiment, button operation is limited in the game. When a tap gesture or a sliding gesture is detected, at least replacement of shortcut bar setting and folding of selection bar operation can be simultaneously performed. In this way, a player is to perform fewer steps with fewest buttons, simplifying processing of the target object, and meeting an urgent need of the player to quickly select and use items. Processing is more proper in case of a plurality of items, which is extremely important in a shooting game in which every second counts, relieving contradiction between operation convenience for a player and a simple and beautiful interface.

For brevity, the foregoing methods are described as a series of action combinations. However, a person skilled in the art is to be aware that the present disclosure is not limited to the order of the described actions, because some steps may be performed in another sequence or simultaneously according to the present disclosure. In addition, a person skilled in the art is further to understand that the embodiments in the description are exemplary embodiments, and the involved actions and modules mentioned are not necessarily required by the present disclosure.

According to the above descriptions of the implementations, a person skilled in the art may clearly learn that the method according to the above embodiments may be implemented by software and a necessary universal hardware platform, or may be implemented by hardware. However, in most cases, software and a general hardware platform are an exemplary implementation. Based on this understanding, the technical solution of the application, in essence, or a part contributing to the related art may be embodied in a form of a software product. The software product is stored in a storage medium (such as a ROM/RAM, a disk, or a CD), including several instructions for causing a terminal device (such as a mobile phone, a computer, a server, or a network device, etc.) to perform the method in each embodiment of the present disclosure.

Figure 11:
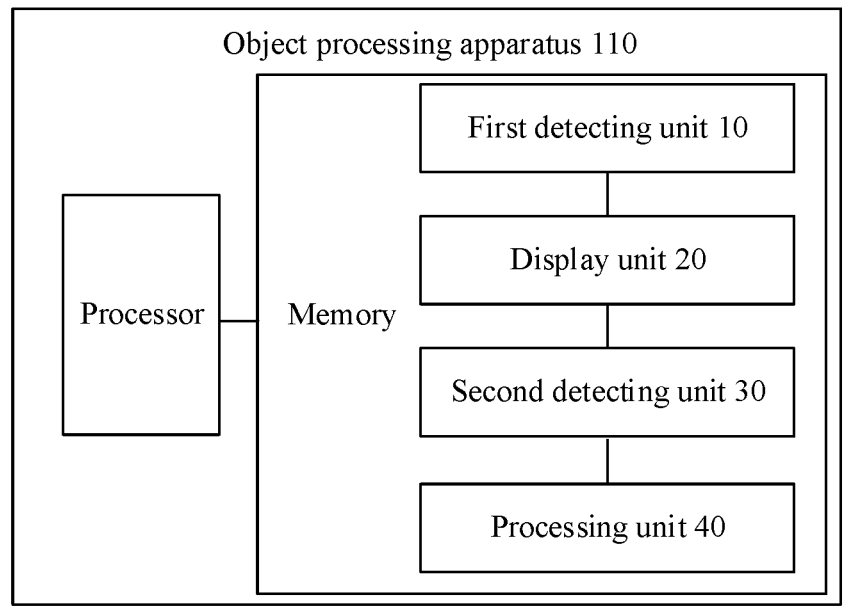
FIG. 11 is a schematic diagram of an object processing apparatus according to an embodiment of the present disclosure.

According to another aspect of the embodiments of the present disclosure, an object processing apparatus for implementing the above object processing method shown in FIG. 2 is further provided. FIG. 11 is a schematic diagram of an object processing apparatus according to an embodiment of the present disclosure. As shown in FIG. 11, the object processing apparatus 110 is located at a terminal, and may include one or more processors (FIG. 11 shows only one processor), and one or more memories (FIG. 11 shows only one memory) storing program units. The program unit is executed by the processor and includes: a first detecting unit 10, a display unit 20, a second detecting unit 30, and a processing unit 40.

The first detecting unit 10 is configured to detect, on a client, a first target gesture performed on a first target area in a virtual scene displayed on the client.

The display unit 20 is configured to display a second target area on the client in response to the first target gesture, the second target area including a plurality of to-be-processed objects in the virtual scene.

The second detecting unit 30 is configured to detect, on the client, a second target gesture performed on a first target object in the plurality of to-be-processed objects.

The processing unit 40 is configured to use the first target object in the virtual scene, display the first target object in a third target area in the virtual scene, and hide the second target area in the virtual scene in response to the second target gesture.

Optionally, the processing unit 40 includes: a replacing module configured to replace a second target object displayed in the third target area with the first target object, the second target object being displayed in the third target area before the first target gesture performed on the first target area is detected on the client. Alternatively, the first display module is configured to display both the first target object and the second target object in the third target area.

Optionally, the first detecting unit 10 includes: a first detecting unit configured to detect, on the client, a single tap gesture or a double tap gesture performed on a target indication button, the first target area in the virtual scene displayed on the client including an area in which the target indication button is displayed in the virtual scene, and the first target gesture including the single tap gesture or the double tap gesture; or a second detecting unit configured to detect, on the client, a sliding gesture performed on the third target area, the first target area in the virtual scene displayed on the client including the third target area, and the first target gesture including the sliding gesture.

Optionally, the processing unit 40 includes: a first processing module configured to: during use of the first target object, display the first target object in the third target area in the virtual scene and hide the second target area in the virtual scene.

Optionally, the apparatus further includes: a first display unit configured to: after the first target object is used in the virtual scene, the first target object is displayed in the third target area in the virtual scene, and the second target area is hidden in the virtual scene in response to the second target gesture, after the first target object is used up in the virtual scene, display a fourth target object in a plurality of third target objects in the third target area, the third target object being an object in the plurality of to-be-processed objects other than the first target object.

Optionally, the apparatus further includes: an obtaining unit, a first determining unit, and a second determining unit. The obtaining unit is configured to: before the fourth target object in the plurality of third target objects is displayed in the third target area, obtain at least information about a virtual control object in the virtual scene, information about each of the third target objects, and historical status information between the virtual control object and each of the third target objects, the historical status information being used for indicating a number of times each of the third target objects and the virtual control object are being used in combination in the virtual scene in a past period of time. The first determining unit is configured to determine, according to at least the information about the virtual control object, the information about each of the third target objects, and the historical status information, a probability that each of the third target objects and the virtual control object are to be used in combination in the virtual scene. The second determining unit is configured to determine, as the fourth target object, a third target object with a highest probability to be used in combination with the virtual control object in the virtual scene.

Optionally, the second determining unit includes: a sorting module configured to sort the plurality of third target objects in a target order according to the probability that each of the third target objects and the virtual control object are to be used in combination in the virtual scene, the target order being used for indicating a descending order or an ascending order of probabilities of the plurality of third target objects; and a determining module configured to determine, as the fourth target object, the third target object in the plurality of sorted third target objects with the highest probability.

Optionally, the information about the virtual control object in one embodiment includes: attribute information of the virtual control object used for indicating a current attribute of the virtual control object. The information about each of the third target objects includes at least one of the following: a number of the third target objects; a type of each of the third target objects; whether each of the third target objects is currently selected to be used, in the virtual scene, in combination with the virtual control object in the virtual scene; and whether each of the third target objects is currently being used, in the virtual scene, in combination with the virtual control object in the virtual scene.

Optionally, the second target gesture in one embodiment includes at least one of the following: a single tap gesture performed on the first target object; a double tap gesture performed on the first target object; and a sliding gesture performed on the first target object.

Optionally, the first detecting unit 10 includes: a third detecting module configured to detect, on a first-person shooting game (FPS) client, the first target gesture performed on the first target area in the virtual scene displayed on the client, the client including the FPS client. The display unit 20 includes: a second display module configured to display the second target area on the FPS client in response to the first target gesture, the second target area including a plurality of virtual attack accessory equipment in the virtual scene. The second detecting unit 30 includes: a fourth detecting module configured to detect, on the FPS client, the second target gesture performed on a first virtual attack accessory equipment in the plurality of virtual attack accessory equipment, the plurality of to-be-processed objects including the plurality of virtual attack accessory equipment, and the first target object including the first virtual attack accessory equipment. The processing unit 40 includes: a second processing module configured to use the first virtual attack accessory equipment in the virtual scene, display the first virtual attack accessory equipment in the third target area in the virtual scene, and hide the second target area in the virtual scene in response to the second target gesture.

Optionally, the apparatus further includes: a second display unit configured to: after the first target object is used in the virtual scene, the first target object is displayed in the third target area in the virtual scene, and the second target area is hidden in the virtual scene in response to the second target gesture, display, on an item interaction interface of the virtual scene or in the virtual scene, an operation result of using the first target object in the virtual scene, displaying the first target object in the third target area in the virtual scene, and hiding the second target area in the virtual scene in response to the second target gesture, the operation result being used for indicating use of the first target object in the virtual scene, displaying of the first target object in the third target area in the virtual scene, and hiding of the second target area in the virtual scene.

In one embodiment, the first detecting unit 10 may be configured to perform S202, and the display unit 20 may be configured to perform S204, the second detecting unit 30 may be configured to perform S206, and the processing unit 40 may be configured to perform S208.

Figure 12:
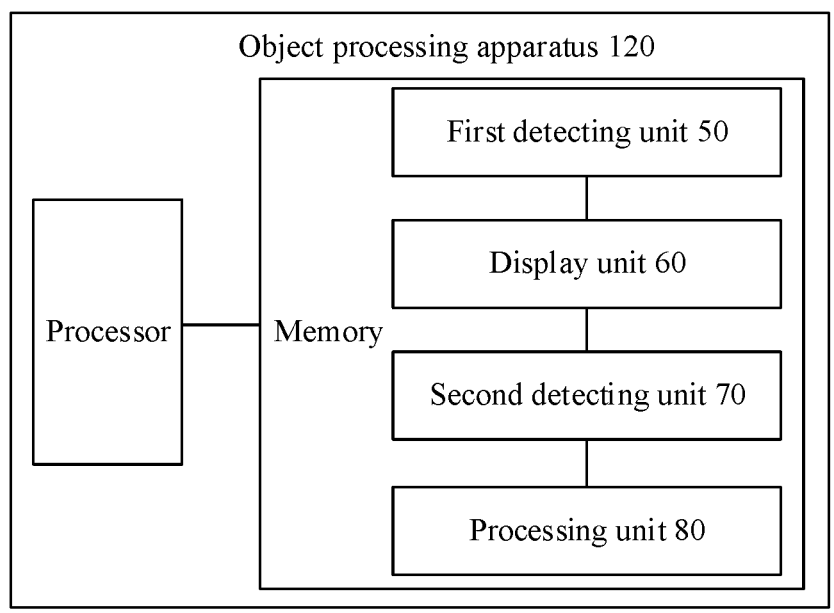
FIG. 12 is a schematic diagram of another object processing apparatus according to an embodiment of the present disclosure.

According to another aspect of the embodiments of the present disclosure, an object processing apparatus for implementing the above object processing method shown in FIG. 3 is further provided. FIG. 12 is a schematic diagram of an object processing apparatus according to an embodiment of the present disclosure. As shown in FIG. 12, the object processing apparatus 120 is located at a terminal, and may include one or more processors (FIG. 12 shows only one processor), and one or more memories (FIG. 12 shows only one memory) storing program units. The program unit is executed by the processor and includes: a first detecting unit 50, a display unit 60, a second detecting unit 70, and a processing unit 80.

The first detecting unit 50 is configured to detect, on a client, a first target gesture performed on a first target area in a virtual scene displayed on the client.

The display unit 60 is configured to display a second target area on the client in response to the first target gesture, the second target area including a plurality of to-be-processed objects in the virtual scene.

The second detecting unit 70 is configured to detect, on the client, a second target gesture performed on a first target object in the plurality of to-be-processed objects.

The processing unit 80 is configured to display the first target object in a third target area in the virtual scene and hide the second target area in the virtual scene in response to the second target gesture, the first target object being not used in the virtual scene.

Optionally, the second target gesture in one embodiment includes one of the following: a touch-and-press gesture performed on the first target object according to a first force, the first force being greater than a first target threshold; a touch-and-press gesture performed on the first target object according to a second force, the second force being not greater than the first target threshold; a touch-and-press gesture continuously performed on the first target object according to target duration, the target duration being greater than a second target threshold.

In one embodiment, the first detecting unit 50 may be configured to perform S302, and the display unit 60 may be configured to perform S304, the second detecting unit 70 may be configured to perform S306, and the processing unit 80 may be configured to perform S308.

In one embodiment, when the second target gesture performed on the first target object in the plurality of to-be-processed objects is detected, the first target object is used in the virtual scene, and the first target object is displayed in the third target area in the virtual scene, and the second target area is hidden in the virtual scene, that is, processing of the target object on the client can be simultaneously performed through the second target gesture, so that multi-step operations of separately selecting and using the first target object and hiding the second target area are avoided, thereby simplifying processing of the target object, resolving the technical problem that processing of the target object is complex in the related art.

Examples implemented by the above units and modules and application scenarios are the same as those of the corresponding steps, but are not limited to the contents disclosed in the above embodiments. As a part of the apparatus, the above units and modules may run in a hardware environment shown in FIG. 1, and may be implemented by software or hardware. The hardware environment includes a network environment.

According to still another aspect of the embodiments of the present disclosure, an electronic apparatus for implementing the above object processing method is further provided.

Figure 13:
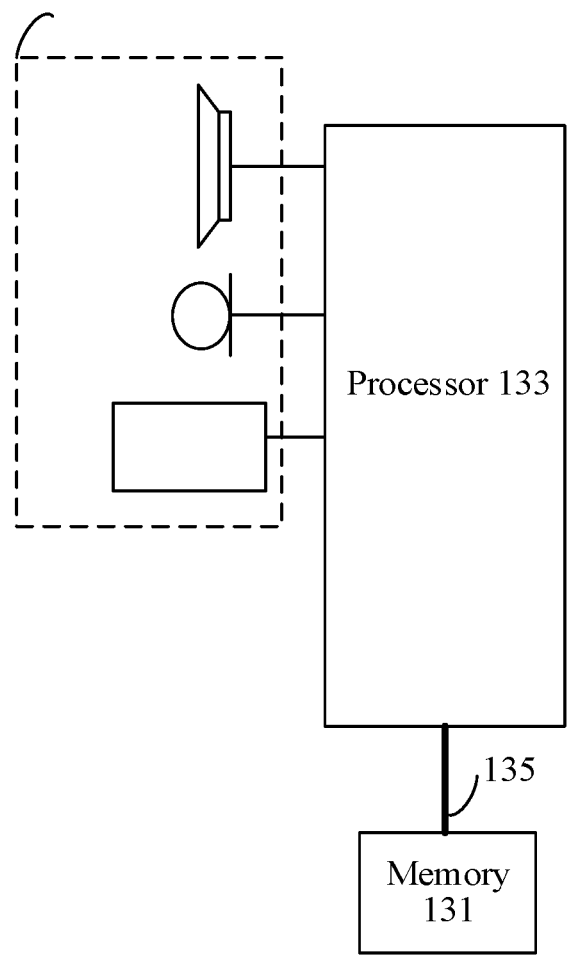
FIG. 13 is a structural block diagram of an electronic apparatus according to an embodiment of the present disclosure.

FIG. 13 is a structural block diagram of an electronic apparatus according to an embodiment of the present disclosure. As shown in FIG. 13, the electronic apparatus may include: a memory 131 and a processor 133. The memory 131 stores a computer program. The processor 133 is configured to perform the steps in any one of the foregoing method embodiments through the computer program. Optionally, as shown in FIG. 13, the electronic apparatus may further include a transmission apparatus 135 and an input/output device 137.

Optionally, in one embodiment, the electronic apparatus may be located in at least one of a plurality of network devices of a computer network.

Optionally, in one embodiment, the processor 133 may be configured to perform: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and using the first target object in the virtual scene, displaying the first target object in a third target area in the virtual scene, and hiding the second target area in the virtual scene in response to the second target gesture.

The processor 133 is further configured to perform the following step: replacing a second target object displayed in the third target area with the first target object, the second target object being displayed in the third target area before the first target gesture performed on the first target area is detected on the client; or displaying both the first target object and the second target object in the third target area.

The processor 133 is further configured to perform the following step: detecting, on the client, a single tap gesture or a double tap gesture performed on a target indication button, the first target area in the virtual scene displayed on the client including an area in which the target indication button is displayed in the virtual scene, and the first target gesture including the single tap gesture or the double tap gesture; or detecting, on the client, a sliding gesture performed on the third target area, the first target area in the virtual scene displayed on the client including the third target area, and the first target gesture including the sliding gesture.

The processor 133 is further configured to perform the following step: during use of the first target object, displaying the first target object in the third target area in the virtual scene and hiding the second target area in the virtual scene.

The processor 133 is further configured to perform the following step: after the first target object is used in the virtual scene, the first target object is displayed in the third target area in the virtual scene, and the second target area is hidden in the virtual scene in response to the second target gesture, after the first target object is used up in the virtual scene, displaying a fourth target object in a plurality of third target objects in the third target area, the third target object being an object in the plurality of to-be-processed objects other than the first target object.

The processor 133 is further configured to perform the following steps: before the fourth target object in the plurality of third target objects is displayed in the third target area, obtaining at least information about a virtual control object in the virtual scene, information about each of the third target objects, and historical status information between the virtual control object and each of the third target objects, the historical status information being used for indicating a number of times each of the third target objects and the virtual control object are being used in combination in the virtual scene in a past period of time; determining, according to at least the information about the virtual control object, the information about each of the third target objects, and the historical status information, a probability that each of the third target objects and the virtual control object are to be used in combination in the virtual scene; and determining, as the fourth target object, a third target object with a highest probability to be used in combination with the virtual control object in the virtual scene.

The processor 133 is further configured to perform the following steps: sorting the plurality of third target objects in a target order according to the probability that each of the third target objects and the virtual control object are to be used in combination in the virtual scene, the target order being used for indicating a descending order or an ascending order of probabilities of the plurality of third target objects; and determining, as the fourth target object, the third target object in the plurality of sorted third target objects with the highest probability.

The processor 133 is further configured to perform the following steps: detecting, on a first-person shooting game (FPS) client, the first target gesture performed on the first target area in the virtual scene displayed on the client, the client including the FPS client; displaying the second target area on the FPS client in response to the first target gesture, the second target area including a plurality of virtual attack accessory equipment in the virtual scene; detecting, on the FPS client, the second target gesture performed on a first virtual attack accessory equipment in the plurality of virtual attack accessory equipment, the plurality of to-be-processed objects including the plurality of virtual attack accessory equipment, and the first target object including the first virtual attack accessory equipment; and using the first virtual attack accessory equipment in the virtual scene, displaying the first virtual attack accessory equipment in the third target area in the virtual scene, and hiding the second target area in the virtual scene in response to the second target gesture.

The processor 133 is further configured to perform the following steps: after the first target object is used in the virtual scene, the first target object is displayed in the third target area in the virtual scene, and the second target area is hidden in the virtual scene in response to the second target gesture, displaying, on an item interaction interface of the virtual scene or in the virtual scene, an operation result of using the first target object in the virtual scene, displaying the first target object in the third target area in the virtual scene, and hiding the second target area in the virtual scene in response to the second target gesture, the operation result being used for indicating use of the first target object in the virtual scene, displaying of the first target object in the third target area in the virtual scene, and hiding of the second target area in the virtual scene.

Optionally, in one embodiment, the processor 133 may be configured to perform: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and displaying the first target object in a third target area in the virtual scene and hiding the second target area in the virtual scene in response to the second target gesture, the first target object being not used in the virtual scene.

Alternatively, a person of ordinary skill in the art may understand that the structure shown in FIG. 13 is merely for illustration, and the electronic apparatus may also be a terminal device such as a smart phone (such as an Android mobile phone, an iOS mobile phone, etc.), a tablet computer, a palmtop computer, and a mobile Internet device (MID), a portable Android device (PAD), etc. FIG. 13 does not constitute a limitation on the structure of the electronic apparatus. For example, the electronic device may further include more or fewer components (such as a network interface, a display apparatus, etc.) than those shown in FIG. 13, or have a configuration different from that shown in FIG. 13.

The memory 131 may be configured to store software programs and modules, for example, program instructions/modules corresponding to the object processing method and apparatus in the embodiments of the present disclosure. The processor 133 executes various functional applications and data processing by running the software programs and the modules stored in the memory 131, that is, implements the above object processing method.

The memory 131 may include a high-speed random access memory, and may further include a non-volatile memory, such as one or more magnetic storage devices, flash memories, or other non-volatile solid-state memories. In some embodiments, the memory 131 may further include memories remotely disposed relative to the processor 133, and these remote memories may be connected to a terminal through a network. An example of the network includes, but is not limited to, the Internet, an intranet, a local area network, a mobile communication network, and a combination thereof.

The above transmission apparatus 135 is configured to receive or transmit data through a network. A specific example of the network may include a wired network and a wireless network. In an example, the transmission apparatus 135 includes a network interface adapter (network interface controller, NIC) that may be connected to other network devices and routers through a network cable to communicate with the Internet or a local area network. In an example, the transmission apparatus 135 is a radio frequency (RF) module configured to communicate with the Internet in a wireless manner.

Optionally, the memory 131 is configured to store an application.

The present disclosure further provides an object processing solution. The solution includes: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and using the first target object in the virtual scene, displaying the first target object in a third target area in the virtual scene, and hiding the second target area in the virtual scene in response to the second target gesture. When the second target gesture performed on the first target object in the plurality of to-be-processed objects is detected, the first target object is used in the virtual scene, and the first target object is displayed in the third target area in the virtual scene, and the second target area is hidden in the virtual scene, that is, processing of the target object on the client can be simultaneously performed through the second target gesture, so that multi-step operations of separately selecting and using the first target object and hiding the second target area are avoided, thereby simplifying processing of the target object, resolving the technical problem that processing of the target object is complex in the related art.

An embodiment of the present disclosure further provides a storage medium in which a computer program is stored. The computer program, when run, is configured to perform steps in anyone of the above method embodiments.

Optionally, in one embodiment, the storage medium may be configured to store a computer program for performing: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and using the first target object in the virtual scene, displaying the first target object in a third target area in the virtual scene, and hiding the second target area in the virtual scene in response to the second target gesture.

Optionally, the storage medium is further configured to store a program code for performing the following step: replacing a second target object displayed in the third target area with the first target object, the second target object being displayed in the third target area before the first target gesture performed on the first target area is detected on the client; or displaying both the first target object and the second target object in the third target area.

Optionally, the storage medium is further configured to store a program code for performing the following step: detecting, on the client, a single tap gesture or a double tap gesture performed on a target indication button, the first target area in the virtual scene displayed on the client including an area in which the target indication button is displayed in the virtual scene, and the first target gesture including the single tap gesture or the double tap gesture; or detecting, on the client, a sliding gesture performed on the third target area, the first target area in the virtual scene displayed on the client including the third target area, and the first target gesture including the sliding gesture.

Optionally, the storage medium is further configured to store a program code for performing the following step: during use of the first target object, displaying the first target object in the third target area in the virtual scene and hiding the second target area in the virtual scene.

Optionally, the storage medium is further configured to store a program code for performing the following step: after the first target object is used in the virtual scene, the first target object is displayed in the third target area in the virtual scene, and the second target area is hidden in the virtual scene in response to the second target gesture, after the first target object is used up in the virtual scene, displaying a fourth target object in a plurality of third target objects in the third target area, the third target object being an object in the plurality of to-be-processed objects other than the first target object.

Optionally, the storage medium is further configured to store a program code for performing the following steps: before the fourth target object in the plurality of third target objects is displayed in the third target area, obtaining at least information about a virtual control object in the virtual scene, information about each of the third target objects, and historical status information between the virtual control object and each of the third target objects, the historical status information being used for indicating a number of times each of the third target objects and the virtual control object are being used in combination in the virtual scene in a past period of time; determining, according to at least the information about the virtual control object, the information about each of the third target objects, and the historical status information, a probability that each of the third target objects and the virtual control object are to be used in combination in the virtual scene; and determining, as the fourth target object, a third target object with a highest probability to be used in combination with the virtual control object in the virtual scene.

Optionally, the storage medium is further configured to store a program code for performing the following steps: sorting the plurality of third target objects in a target order according to the probability that each of the third target objects and the virtual control object are to be used in combination in the virtual scene, the target order being used for indicating a descending order or an ascending order of probabilities of the plurality of third target objects; and determining, as the fourth target object, the third target object in the plurality of sorted third target objects with the highest probability.

Optionally, the storage medium is further configured to store a program code for performing the following steps: detecting, on a first-person shooting game (FPS) client, the first target gesture performed on the first target area in the virtual scene displayed on the client, the client including the FPS client. displaying the second target area on the FPS client in response to the first target gesture, the second target area including a plurality of virtual attack accessory equipment in the virtual scene; detecting, on the FPS client, the second target gesture performed on a first virtual attack accessory equipment in the plurality of virtual attack accessory equipment, the plurality of to-be-processed objects including the plurality of virtual attack accessory equipment, and the first target object including the first virtual attack accessory equipment; and using the first virtual attack accessory equipment in the virtual scene, displaying the first virtual attack accessory equipment in the third target area in the virtual scene, and hiding the second target area in the virtual scene in response to the second target gesture.

Optionally, the storage medium is further configured to store a program code for performing the following step: after the first target object is used in the virtual scene, the first target object is displayed in the third target area in the virtual scene, and the second target area is hidden in the virtual scene in response to the second target gesture, displaying, on an item interaction interface of the virtual scene or in the virtual scene, an operation result of using the first target object in the virtual scene, displaying the first target object in the third target area in the virtual scene, and hiding the second target area in the virtual scene in response to the second target gesture, the operation result being used for indicating use of the first target object in the virtual scene, displaying of the first target object in the third target area in the virtual scene, and hiding of the second target area in the virtual scene.

Optionally, in one embodiment, the storage medium may be further configured to store a computer program for performing: detecting, on a client, a first target gesture performed on a first target area in a virtual scene displayed on the client; displaying a second target area on the client in response to the first target gesture, the second target area including a plurality of to-be-processed objects in the virtual scene; detecting, on the client, a second target gesture performed on a first target object in the plurality of to-be-processed objects; and displaying the first target object in a third target area in the virtual scene and hiding the second target area in the virtual scene in response to the second target gesture, the first target object being not used in the virtual scene.

Optionally, the storage medium is further configured to store a computer program for performing the steps included in the method in the above embodiment, and the details are not described again.

Optionally, in one embodiment, a person of ordinary skill in the art can understand that, all or some steps in the methods in the foregoing embodiments may be performed by a program instructing related hardware of a terminal device. The program may be stored in a computer-readable storage medium. The storage medium may include: a flash memory drive, a read-only memory (ROM), a random access memory (RAM), a magnetic disk, an optical disc, or the like.

The sequence numbers of the foregoing embodiments of the present disclosure are merely for description purpose, and do not indicate the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of the present disclosure may be implemented in a form of a software product. The computer software product is stored in a storage medium and includes several instructions for instructing one or more computer devices (which may be a PC, a server, a network device, or the like) to perform all or some of operations of the methods in the embodiments of the present disclosure.

In the foregoing embodiments of the present disclosure, descriptions of the embodiments have different emphases, and as for parts that are not described in detail in one embodiment, reference can be made to the relevant descriptions of the other embodiments.

In the several embodiments provided in the present disclosure, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and the parts displayed as units may or may not be physical units, may be located in one position, or may be distributed on multiple network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of software functional unit.

The foregoing descriptions are merely exemplary implementations of the present disclosure. A person of ordinary skill in the art may make improvements and refinements without departing from the principle of the present disclosure, and these all fall within the protection scope of the present disclosure.

What is claimed is:

1. An object processing method, comprising:
   detecting, on a client, a first target gesture performed on a first target area in a virtual scene displayed on the client, wherein the client displays an initial object in a third target area, the third target area being a shortcut display area of the client having a corresponding shortcut operation;
   displaying a second target area on the client in response to the first target gesture, wherein the second target area comprises a plurality of to-be-processed objects in the virtual scene;
   detecting, on the client, a second target gesture performed on a first target object in the plurality of to-be-processed objects, the first target object being an object used in the virtual scene by a virtual game character controlled by an account logged into the client; and
   in response to the second target gesture, simultaneously performing: using the first target object in the virtual scene, displaying the first target object in the third target area in the virtual scene by replacing the initial object, and hiding the second target area in the virtual scene,
   wherein after displaying the first target object in the third target area, subsequent using of the first target object by the virtual game character in the virtual scene is triggered upon detection of the shortcut operation.

2. The method according to claim 1, wherein the displaying the first target object in a third target area in the virtual scene comprises:
   replacing a second target object displayed in the third target area with the first target object, wherein the second target object is displayed in the third target area before the first target gesture performed on the first target area is detected on the client; or
   displaying both the first target object and the second target object in the third target area.

3. The method according to claim 1, wherein the detecting, on a client, a first target gesture performed on a first target area in a virtual scene displayed on the client comprises:
   detecting, on the client, a single tap gesture or a double tap gesture performed on a target indication button, wherein the first target area in the virtual scene displayed on the client comprises an area in which the target indication button is displayed in the virtual scene, and the first target gesture comprises the single tap gesture or the double tap gesture; or
   detecting, on the client, a sliding gesture performed on the third target area, wherein the first target area in the virtual scene displayed on the client comprises the third target area, and the first target gesture comprises the sliding gesture.

4. The method according to claim 1, wherein the using the first target object in the virtual scene, displaying the first target object in a third target area in the virtual scene, and hiding the second target area in the virtual scene comprises:
during use of the first target object, displaying the first target object in the third target area in the virtual scene and hiding the second target area in the virtual scene.

5. The method according to claim 1, wherein after the using the first target object in the virtual scene, displaying the first target object in a third target area in the virtual scene, and hiding the second target area in the virtual scene, the method further comprises:
after the first target object is used up in the virtual scene, displaying a fourth target object in a plurality of third target objects in the third target area, wherein the third target object is an object in the plurality of to-be-processed objects other than the first target object.

6. The method according to claim 5, wherein before the displaying a fourth target object in a plurality of third target objects in the third target area, the method further comprises:
obtaining at least information about a virtual control object in the virtual scene, information about each of the third target objects, and historical status information between the virtual control object and each of the third target objects, wherein the historical status information is used for indicating a number of times each of the third target objects and the virtual control object are being used in combination in the virtual scene in a past period of time;
determining, according to at least the information about the virtual control object, the information about each of the third target objects, and the historical status information, a probability that each of the third target objects and the virtual control object are to be used in combination in the virtual scene; and
determining, as the fourth target object, a third target object with a highest probability to be used in combination with the virtual control object in the virtual scene.

7. The method according to claim 6, wherein the determining, as the fourth target object, a third target object with a highest probability to be used in combination with the virtual control object in the virtual scene comprises:
sorting the plurality of third target objects in a target order according to the probability that each of the third target objects and the virtual control object are to be used in combination in the virtual scene, wherein the target order is used for indicating a descending order or an ascending order of probabilities of the plurality of third target objects; and
determining, as the fourth target object, the third target object in the plurality of sorted third target objects with the highest probability.

8. The method according to claim 6, wherein the information about the virtual control object comprises: attribute information of the virtual control object used for indicating a current attribute of the virtual control object; and
the information about each of the third target objects comprises at least one of the following: a number of the third target objects; a type of each of the third target objects; whether each of the third target objects is currently selected to be used, in the virtual scene, in combination with the virtual control object in the virtual scene; and whether each of the third target objects is currently being used, in the virtual scene, in combination with the virtual control object in the virtual scene.

9. The method according to claim 1, wherein the second target gesture comprises at least one of:
a single tap gesture performed on the first target object;
a double tap gesture performed on the first target object; and
a sliding gesture performed on the first target object.

10. The method according to claim 1, wherein
the detecting, on a client, a first target gesture performed on a first target area in a virtual scene displayed on the client comprises: detecting, on a first-person shooting game (FPS) client, the first target gesture performed on the first target area in the virtual scene displayed on the client, wherein the client comprises the FPS client;
the displaying a second target area on the client in response to the first target gesture comprises: displaying the second target area on the FPS client in response to the first target gesture, wherein the second target area comprises a plurality of virtual attack accessory equipment in the virtual scene;
the detecting, on the client, a second target gesture performed on a first target object in the plurality of to-be-processed objects comprises: detecting, on the FPS client, the second target gesture performed on a first virtual attack accessory equipment in the plurality of virtual attack accessory equipment, wherein the plurality of to-be-processed objects comprise the plurality of virtual attack accessory equipment, and the first target object comprises the first virtual attack accessory equipment; and
the using the first target object in the virtual scene, displaying the first target object in a third target area in the virtual scene, and hiding the second target area in the virtual scene in response to the second target gesture comprises: using the first virtual attack accessory equipment in the virtual scene, displaying the first virtual attack accessory equipment in the third target area in the virtual scene, and hiding the second target area in the virtual scene in response to the second target gesture.

11. The method according to claim 1, wherein after the using the first target object in the virtual scene, displaying the first target object in a third target area in the virtual scene, and hiding the second target area in the virtual scene in response to the second target gesture, the method further comprises:
displaying, on an item interaction interface of the virtual scene or in the virtual scene, an operation result of using the first target object in the virtual scene, displaying the first target object in the third target area in the virtual scene, and hiding the second target area in the virtual scene in response to the second target gesture, wherein the operation result is used for indicating use of the first target object in the virtual scene, displaying of the first target object in the third target area in the virtual scene, and hiding of the second target area in the virtual scene.

12. A non-transitory computer readable storage medium storing computer instructions, the computer instructions, when being executed by a processor, causing the processor to perform:
detecting, on a client, a first target gesture performed on a first target area in a virtual scene displayed on the client, wherein the client displays an initial object in a third target area, the third target area being a shortcut display area of the client having a corresponding shortcut operation;

displaying a second target area on the client in response to the first target gesture, wherein the second target area comprises a plurality of to-be-processed objects in the virtual scene;

detecting, on the client, a second target gesture performed on a first target object in the plurality of to-be-processed objects, the first target object being an object usable in the virtual scene by a virtual game character controlled by an account logged into the client; and in response to the second target gesture, simultaneously performing: using the first target object in the virtual scene, displaying the first target object in a third target area in the virtual scene by replacing the initial object, and hiding the second target area in the virtual scene, wherein after displaying the first target object in the third target area, subsequent using of the first target object by the virtual game character in the virtual scene is triggered upon detection of the shortcut operation.

13. The storage medium according to claim 12, wherein the second target gesture comprises one of:

a touch-and-press gesture performed on the first target object according to a first force, wherein the first force is greater than a first target threshold;

a touch-and-press gesture performed on the first target object according to a second force, wherein the second force is not greater than the first target threshold; and a touch-and-press gesture continuously performed on the first target object according to target duration, wherein the target duration is greater than a second target threshold.

14. An object processing apparatus, comprising:

at least one memory storing computer program instructions; and one or more processor coupled to the memory and, when executing the computer program instructions, configured to perform:

detecting, on a client, a first target gesture performed on a first target area in a virtual scene displayed on the client, wherein the client displays an initial object in a third target area, the third target area being a shortcut display area of the client having a corresponding shortcut operation;

displaying a second target area on the client in response to the first target gesture, wherein the second target area comprises a plurality of to-be-processed objects in the virtual scene;

detecting, on the client, a second target gesture performed on a first target object in the plurality of to-be-processed objects, the first target object being an object used in the virtual scene by a virtual game character controlled by an account logged into the client; and in response to the second target gesture, simultaneously performing: using the first target object in the virtual scene, displaying the first target object in the third target area in the virtual scene by replacing the initial object, and hiding the second target area in the virtual scene, wherein after displaying the first target object in the third target area, subsequent using of the first target object by the virtual game character in the virtual scene is triggered upon detection of the shortcut operation.

15. The object processing apparatus according to claim 14, wherein the displaying the first target object in a third target area in the virtual scene comprises:

replacing a second target object displayed in the third target area with the first target object, wherein the second target object is displayed in the third target area before the first target gesture performed on the first target area is detected on the client; or displaying both the first target object and the second target object in the third target area.

16. The object processing apparatus according to claim 14, wherein the detecting, on a client, a first target gesture performed on a first target area in a virtual scene displayed on the client comprises:

detecting, on the client, a single tap gesture or a double tap gesture performed on a target indication button, wherein the first target area in the virtual scene displayed on the client comprises an area in which the target indication button is displayed in the virtual scene, and the first target gesture comprises the single tap gesture or the double tap gesture; or detecting, on the client, a sliding gesture performed on the third target area, wherein the first target area in the virtual scene displayed on the client comprises the third target area, and the first target gesture comprises the sliding gesture.

17. The object processing apparatus according to claim 14, wherein the using the first target object in the virtual scene, displaying the first target object in a third target area in the virtual scene, and hiding the second target area in the virtual scene comprises:

during use of the first target object, displaying the first target object in the third target area in the virtual scene and hiding the second target area in the virtual scene.

18. The object processing apparatus according to claim 14, wherein after the using the first target object in the virtual scene, displaying the first target object in a third target area in the virtual scene, and hiding the second target area in the virtual scene, the processor is further configured to perform:

after the first target object is used up in the virtual scene, displaying a fourth target object in a plurality of third target objects in the third target area, wherein the third target object is an object in the plurality of to-be-processed objects other than the first target object.

19. The object processing apparatus according to claim 18, wherein before the displaying a fourth target object in a plurality of third target objects in the third target area, the processor is further configured to perform:

obtaining at least information about a virtual control object in the virtual scene, information about each of the third target objects, and historical status information between the virtual control object and each of the third target objects, wherein the historical status information is used for indicating a number of times each of the third target objects and the virtual control object are being used in combination in the virtual scene in a past period of time;

determining, according to at least the information about the virtual control object, the information about each of the third target objects, and the historical status information, a probability that each of the third target objects and the virtual control object are to be used in combination in the virtual scene; and determining, as the fourth target object, a third target object with a highest probability to be used in combination with the virtual control object in the virtual scene.

20. The object processing apparatus according to claim 19, wherein the determining, as the fourth target object, a third target object with a highest probability to be used in combination with the virtual control object in the virtual scene comprises:
- sorting the plurality of third target objects in a target order according to the probability that each of the third target objects and the virtual control object are to be used in combination in the virtual scene, wherein the target order is used for indicating a descending order or an ascending order of probabilities of the plurality of third target objects; and
- determining, as the fourth target object, the third target object in the plurality of sorted third target objects with the highest probability.

* * * * *